United States Patent
Guo et al.

(10) Patent No.: US 10,499,254 B2
(45) Date of Patent: Dec. 3, 2019

(54) FREQUENCY SPECTRUM COORDINATION DEVICE AND METHOD, AND DEVICE AND METHOD IN WIRELESS COMMUNICATION SYSTEM

(71) Applicant: Sony Corporation, Tokyo (JP)

(72) Inventors: Xin Guo, Beijing (CN); Chen Sun, Beijing (CN); Yuxin Wei, Beijing (CN); Jinhui Chen, Beijing (CN)

(73) Assignee: SONY CORPORATION, Tokyo (JP)

( * ) Notice: Subject to any disclaimer, the term of this patent is extended or adjusted under 35 U.S.C. 154(b) by 170 days.

(21) Appl. No.: 15/565,717

(22) PCT Filed: Mar. 3, 2016

(86) PCT No.: PCT/CN2016/075455
§ 371 (c)(1),
(2) Date: Oct. 11, 2017

(87) PCT Pub. No.: WO2016/169340
PCT Pub. Date: Oct. 27, 2016

(65) Prior Publication Data
US 2018/0084429 A1    Mar. 22, 2018

(30) Foreign Application Priority Data
Apr. 21, 2015  (CN) .......................... 2015 1 0191814

(51) Int. Cl.
*H04W 16/14*    (2009.01)
*H04W 72/04*    (2009.01)
*H04W 72/12*    (2009.01)

(52) U.S. Cl.
CPC ........... *H04W 16/14* (2013.01); *H04W 72/04* (2013.01); *H04W 72/12* (2013.01)

(58) Field of Classification Search
None
See application file for complete search history.

(56) References Cited

U.S. PATENT DOCUMENTS 9,820,281 B1 * 11/2017 Werner ............ H04W 72/0453
2009/0097422 A1    4/2009 Halbauer et al.
(Continued)

FOREIGN PATENT DOCUMENTS

| CN | 101365218 A | 2/2009 |
| CN | 102118758 A | 7/2011 |
| CN | 102547734 A | 7/2012 |

OTHER PUBLICATIONS

International Search Report dated May 13, 2016 in PCT/CN2016/075455 filed Mar. 3, 2016.

*Primary Examiner* — Rebecca E Song
*Assistant Examiner* — Emmanuel K Maglo
(74) *Attorney, Agent, or Firm* — Xsensus LLP

(57) ABSTRACT

A frequency spectrum coordination device and method, and a device and a method in a wireless communication system. The frequency spectrum coordination device, used for coordinating usage of shared wireless transmission resources by multiple systems, includes: an acquirement unit, configured to acquire a usage state of the shared wireless transmission resources; and an allocation unit, configured to allocate, according to the usage state, the shared wireless transmission resources for a communication device based on the influence of resource elements to be allocated of one system in multiple systems on the available resource elements of other systems in multiple systems, and the resource allocation granularity of one system is smaller than the resource allocation granularity of other systems.

20 Claims, 14 Drawing Sheets

(56) References Cited

U.S. PATENT DOCUMENTS

| | | | |
|---|---|---|---|
| 2010/0232310 A1* | 9/2010 | Hu | H04W 74/0808 |
| | | | 370/252 |
| 2011/0228752 A1 | 9/2011 | Wu | |
| 2013/0315183 A1 | 11/2013 | Xiang et al. | |
| 2015/0111575 A1* | 4/2015 | Lei | H04W 36/08 |
| | | | 455/436 |
| 2016/0037352 A1* | 2/2016 | Wei | H04W 72/1268 |
| | | | 455/454 |
| 2016/0227416 A1* | 8/2016 | Suzuki | H04W 72/0453 |
| 2017/0111889 A1* | 4/2017 | Li | H04W 74/08 |
| 2017/0374558 A1* | 12/2017 | Zhao | H04W 16/10 |

* cited by examiner

FREQUENCY SPECTRUM COORDINATION DEVICE AND METHOD, AND DEVICE AND METHOD IN WIRELESS COMMUNICATION SYSTEM

FIELD

The present disclosure relates to the technical field of wireless communication, and in particular to a spectrum coordinator and a spectrum coordination method for coordinating use of shared radio transmission resources by multiple systems having different resource allocation granularities, and a device and a method in a wireless communication system in this case.

BACKGROUND

With the rapid development of computer and communication technologies, the numbers of user equipment, service requirements and application scenes increase exponentially, which further intensifies the contradiction between wireless service requirements and radio spectrum resources. A traditional exclusive use of spectrum is proved to be an inefficient manner of resource use. More and more new spectrum resources are released from original services and become dynamic access resources shared by multiple systems, which provides possibility of capacity extension of a sharing system. Various standard organizations have drafted sharing principles from various technical perspectives, such as the LTE-LAA (Long-Term Evolution-License-Assisted Access) work group of the 3GPP organization and the 802.19 work group of the IEEE, aiming to achieve efficient sharing.

Although resource sharing among multiple systems makes the increment of system capacity possible in terms of increasing the available spectrum, spectrum division and usage methods are different among the multiple coexisting systems due to their different RATs (Radio Access Technology), and meanwhile, spectrum use priorities of the RATs are also different. At present, a technique for coordinating use differences for shared frequency bands among different RATs to improve an admission capacity of the shared spectrum for different RAT users and ensure the use priorities has not been proposed yet. This problem may result in an inefficient use of the shared frequency bands or even destroy use rights for the frequency bands of the RATs with different priorities.

SUMMARY

A brief summary of the disclosure will be given below to provide basic understanding of some aspects of the disclosure. However, it shall be appreciated that this summary is neither exhaustively descriptive of the disclosure nor intended to define essential or important components or the scope of the disclosure but is merely for the purpose of presenting some concepts of the disclosure in a simplified form and hereby acts as a preamble of more detailed descriptions which will be presented later.

In view of the above problem, an object of the present disclosure is to provide a spectrum coordinator and a spectrum coordination method for coordinating use of shared radio transmission resources by multiple systems having different resource allocation granularities, and a device and a method in a wireless communication system in this case, in which the difference in resource division and use manners and the difference in use priorities resulting from the different radio access technologies adopted in the multiple systems are taken into consideration to improve the utilization efficiency of the shared radio transmission resources and optimize the system performance.

According to an aspect of the present disclosure, a spectrum coordinator is provided for coordinating use of shared radio transmission resources by a plurality of systems, and the spectrum coordinator may include: an acquiring unit configured to acquire use status of the shared radio transmission resources; and an allocating unit configured to allocate, according to the use status, the shared radio transmission resources to communication equipment based on influence of to-be-allocated resource elements of one system of the plurality of systems on available resource elements of other system in the plurality of systems, where a resource allocation granularity of the one system is finer than a resource allocation granularity of the other system.

According to a preferred embodiment, the allocating unit may be further configured to allocate, based on a resource request from communication equipment in the one system of the plurality of systems, the shared radio transmission resources to the communication equipment in the one system.

According to a preferred embodiment, the allocating unit may be further configured to allocate resources to the communication equipment in the one system from the to-be-allocated resource elements in a manner that a sum of the number of the available resource elements and the number of occupied resource elements of the other system is not smaller than the number of preserved resource elements of the other system.

According to another preferred embodiment, the allocating unit may be further configured to allocate resources to the communication equipment in the one system from the to-be-allocated resource elements according to use conditions of occupied resource elements of the one system, which correspond to the same resource element of the other system as the to-be-allocated resource elements.

According to another preferred embodiment, the allocating unit may be further configured to determine a use period of resources allocated to the communication equipment in the one system according to a use period of the occupied resource elements of the one system.

According to another preferred embodiment, the resource request may include at least one of a traffic requirement, geographical location information and a resource use priority.

According to another preferred embodiment, the allocating unit may be further configured to allocate resources to the communication equipment in the one system according to a resource use habit of the other system to reduce resource use collision with the other system.

According to another preferred embodiment, the allocating unit may be configured to preferentially allocate resources having a low probability of being occupied by the other system to the communication equipment in the one system.

According to another preferred embodiment, the acquiring unit may be configured to acquire the use status in at least one of the following manners: information interacting, spectrum sensing and broadcast querying.

According to another preferred embodiment, the use status may include occupied resources of the shared radio transmission resources.

According to another preferred embodiment, the use status may further include a type of communication equipment occupying the occupied resources.

According to another preferred embodiment, in a case that the type of the communication equipment occupying the occupied resources is communication equipment in the one system, the use status may further include the number of the communication equipment in the one system occupying the occupied resources.

According to another preferred embodiment, the spectrum coordinator may further include a resource dividing unit configured to divide the shared radio transmission resources based on influence of the one system on resource availability of the other system, and the allocating unit may be further configured to allocate resources to the communication equipment according to the dividing of the shared radio transmission resources.

According to another preferred embodiment, the resource dividing unit may be configured to divide the shared radio transmission resources in a manner that a resource element of the one system is aligned with a resource element of the other system.

According to another preferred embodiment, the spectrum coordinator may be implemented in a base station in the one system, and the spectrum coordinator may further include: a receiving unit configured to receive the resource request from the communication equipment in the one system; and a notifying unit configured to notify the allocated resources to the communication equipment in the one system.

According to another preferred embodiment, the receiving unit may be further configured to receive information on resources selected to be used from the allocated resources by the communication equipment in the one system.

According to another preferred embodiment, the one system may be an LTE system, and the other system may be one or more of a WI-FI system, a broadcast television system, a radar system and an infrared system.

According to another preferred embodiment, the resource allocating granularity of the LTE system may be based on a time-frequency resource block, and the resource allocating granularity of the WI-FI system may be based on a subchannel having a predetermined bandwidth.

According to another aspect of the present disclosure, a device in a wireless communication system is further provided, the device including: a requesting unit configured to send a resource request to a spectrum coordinator; a receiving unit configured to receive resources allocated by the spectrum coordinator in response to the resource request; and a selecting unit configured to select resources to be used from the allocated resources according to a service quality requirement. The spectrum coordinator is used for coordinating use of shared radio transmission resources by a plurality of systems including the wireless communication system, and the allocated resources are allocated by the spectrum coordinator based on influence of to-be-allocated resource elements of the wireless communication system on available resource elements of other system in the plurality of systems. A resource allocation granularity of the wireless communication system is finer than a resource allocation granularity of the other system.

According to another aspect of the present disclosure, an electronic apparatus including one or more processors is further provided. The one or more processor may be configured to: acquire use status of shared radio transmission resources; and allocate, according to the use status, the shared radio transmission resources to communication equipment based on influence of to-be-allocated resource elements of one system of a plurality of systems on available resource elements of other system in the plurality of systems, where a resource allocation granularity of the one system is finer than a resource allocation granularity of the other system.

According to another aspect of the present disclosure, an electronic apparatus including one or more processors is further provided. The one or more processor may be configured to: send a resource request to a spectrum coordinator; receive resources allocated by the spectrum coordinator in response to the resource request; and select resources to be used from the allocated resources according to a service quality requirement. The spectrum coordinator is used for coordinating use of shared radio transmission resources by a plurality of systems, and the allocated resources are allocated by the spectrum coordinator based on influence of to-be-allocated resource elements of one system of the plurality of systems on available resource elements of other system in the plurality of systems. A resource allocation granularity of the one system is finer than a resource allocation granularity of the other system.

According to another aspect of the present disclosure, a spectrum coordination method is provided for coordinating use of shared radio transmission resources by a plurality of systems. The spectrum coordination method may include: an acquiring step of acquiring use status of the shared radio transmission resources; and an allocating step of allocating, according to the use status, the shared radio transmission resources to communication equipment based on influence of to-be-allocated resource elements of one system of the plurality of systems on available resource elements of other system in the plurality of systems, where a resource allocation granularity of the one system is finer than a resource allocation granularity of the other system.

According to another aspect of the present disclosure, a method in a wireless communication system is provided, including: a requesting step of sending a resource request to a spectrum coordinator; a receiving step of receiving resources allocated by the spectrum coordinator in response to the resource request; and a selecting step of selecting resources to be used from the allocated resources according to a service quality requirement. The spectrum coordinator is used for coordinating use of shared radio transmission resources by a plurality of systems including the wireless communication system, and the allocated resources are allocated by the spectrum coordinator based on influence of to-be-allocated resource elements of the wireless communication system on available resource elements of other system in the plurality of systems. A resource allocation granularity of the wireless communication system is finer than a resource allocation granularity of the other system.

According to other aspects of the present disclosure, computer program codes and a computer program product for implementing the methods of the present disclosure, and a computer readable storage medium, on which the computer program codes for implementing the methods of the present disclosure are recorded, are further provided.

According to embodiments of the present disclosure, use of the shared radio transmission resources by multiple systems adopting different radio access technologies can be effectively coordinated, the resource utilization ratio can be improved and the system performance can be optimized.

Other aspects of embodiments of the present disclosure are given in the following parts of the description. In which, detailed illustration is used to sufficiently disclose preferred embodiments of the embodiments of the present disclosure rather than limit the present disclosure.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings.

DETAILED DESCRIPTION OF EMBODIMENTS

Figure 1A:
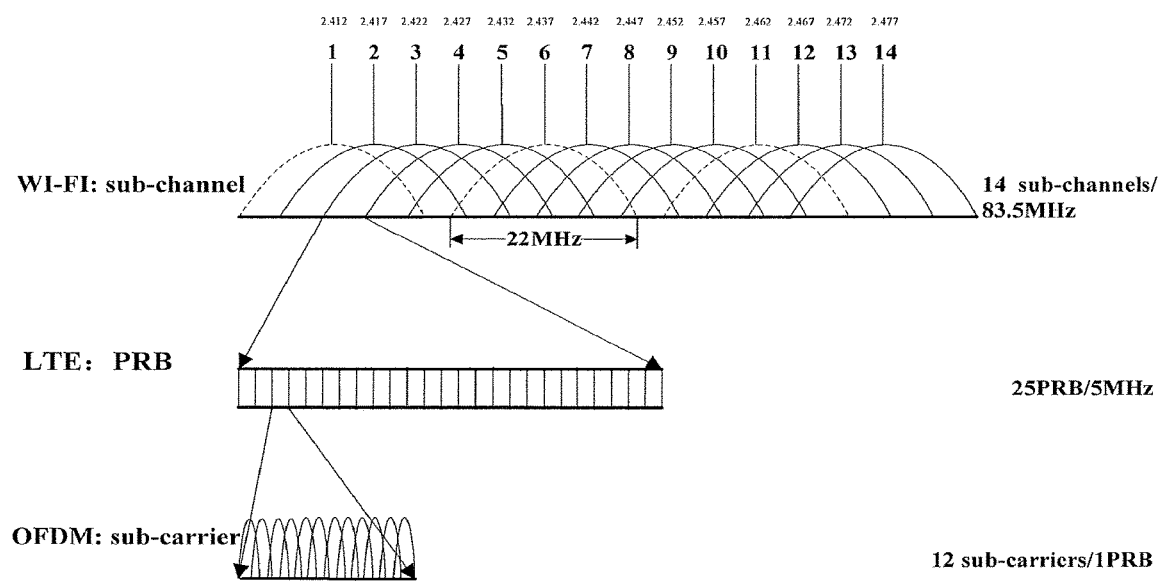
FIG. 1A is a diagram illustrating an example of spectrum allocation and usage manners of different radio access technologies according to an embodiment of the present disclosure.

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or process steps closely relevant to the solutions of the disclosure are illustrated in the drawings while other details less relevant to the disclosure are omitted so as not to obscure the disclosure due to those unnecessary details.

Embodiments of the present disclosure are described in detail below with reference to the FIG. 1 to FIG. 17.

It should be noted that, for coexistence of multiple systems, the difference in spectrum allocation and usage manners among various radio access technologies needs to be considered first. Below this issue will be described for coexistence of a WI-FI system and an LTE system by way of example. However, it should be understood that the embodiment of the present disclosure is not limited to the case in which these two systems coexist, but can be applied to any scene in which any two or more systems adopting different radio access technologies coexist. For example, in USA and Europe, more and more frequency bands, such as frequency bands for broadcast television and frequency bands for radar communication, are released to be shared by multiple systems. Thus the disclosed technique can be also applied to a scene in which a broadcast television system or a radar communication system, instead of a WI-FI system described below, coexists with an LTE system, or other scenes in which multiple systems having different resource allocation granularities coexist, e.g., a scene in which a WI-FI system having a fine granularity and a broadcast television system having a rough granularity coexist.

First, an example of spectrum allocation and usage manners of different radio access technologies according to an embodiment of the present disclosure is described with reference to FIG. 1A. FIG. 1A is a diagram illustrating an example of spectrum allocation and usage manners of different radio access technologies according to an embodiment of the present disclosure.

Figure 1B:
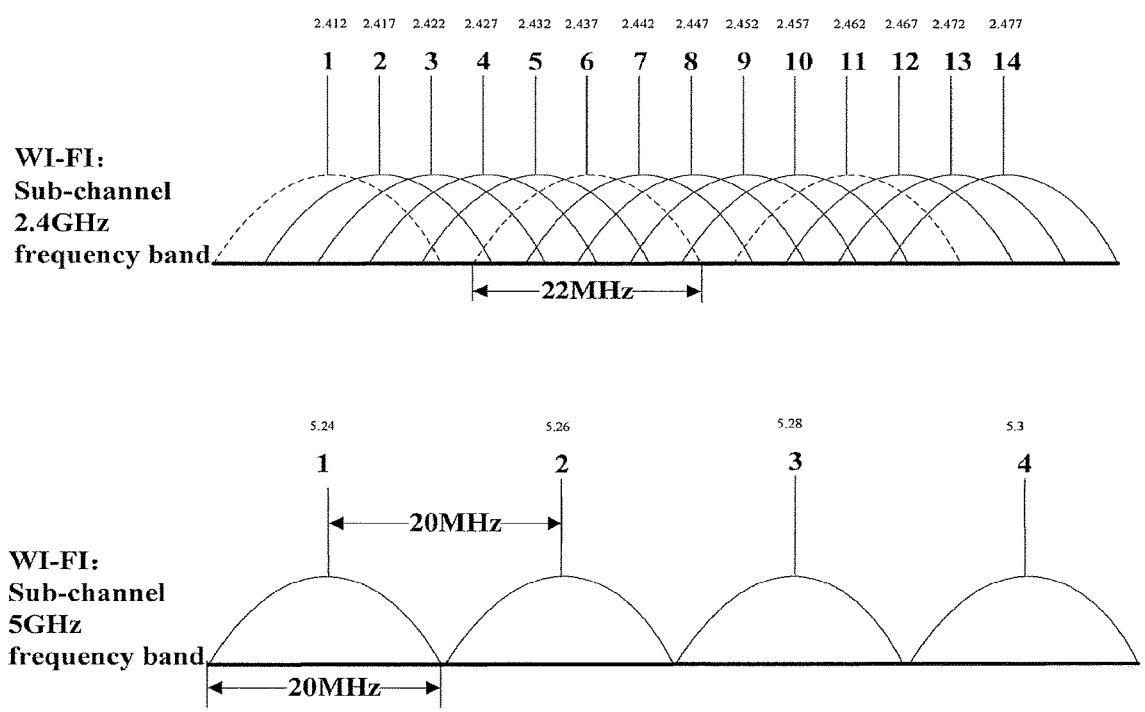
FIG. 1B is a diagram illustrating a comparison example of channel division methods of different frequency bands in a WI-FI system.

As shown in FIG. 1A, for a WI-FI system, the standard IEEE 802.11b/g operates on a frequency band of 2.4 GHz, which has a frequency range from 2.400 to 2.4835 GHz and a total bandwidth of 83.5M. The band is divided into 14 sub-channels, each of which has a bandwidth of 22 MHz. An interval between central frequencies of adjacent sub-channels is 5 MHz. Frequencies in multiple adjacent sub-channels overlap with each other (for example, the frequency in sub-channel 1 overlaps with frequencies in sub-channels 2, 3, 4 and 5). In the whole frequency band, only 3 sub-channels (1, 6, 11) do not overlap with each other and do not interfere with each other. On the other hand, the standard IEEE 802.11ac operates on a frequency band of 5 GHz, in which sub-channels each have a bandwidth of 20 MHz and do not overlap with each other, as shown in FIG. 1B. If the interval between central frequencies of adjacent sub-channels is set to be equal to the bandwidth of each sub-channel, the division method in the frequency band of 5 GHz can be regarded as a special case of the division in the frequency band of 2.4 GHz. It should be noted that, the channel division method in the WI-FI system differs in different frequency bands and different countries. The frequency band of 2.4 GHz and the frequency band of 5 GHz are described here only for illustration, and the method is also applicable to other division methods. Below, description is made by taking a WI-FI system in the frequency band of 2.4 GHz as a communication system having a rough granularity as an example.

In addition, as shown in FIG. 1A, air interface resources in an LTE system are allocated in a basic unit of a physical resource block (PRB). Each PRB includes 12 continuous sub-carries in the frequency domain, and includes 7 continuous normal OFDM symbol cycles in the time domain. In a case of a sub-carrier interval of 15 KHz, one PRB corresponds to radio resource having a bandwidth of 180 kHz and a time period of 0.5 ms.

As can be seen from FIG. 1A, resources in a WI-FI system are allocated in a basic unit (i.e., the resource allocation granularity) of a sub-channel having a bandwidth of 22 MHz, and resources in an LTE system are allocated in a basic unit of a time-frequency resource block having a bandwidth of 180 kHz. That is, the basic resource allocation units of the two systems are different, which determines that occupation manners for radio resources of the WI-FI system and the LTE system are different. Particularly, for example, in the WI-FI system, resources are allocated in the basic unit of a sub-channel, and it needs to occupy the whole unused sub-channel of 22 MHz for communication, while in the LTE system, resources are allocated in the basic unit of a physical resource block, and it only need to occupy a complete PRB of 180 kHz for communication. Generally, when performing spectrum coordination in the multi-system coexistence scene, the wireless communication system having a smaller resource allocation granularity has a better flexibility in resource allocation.

Figure 2:
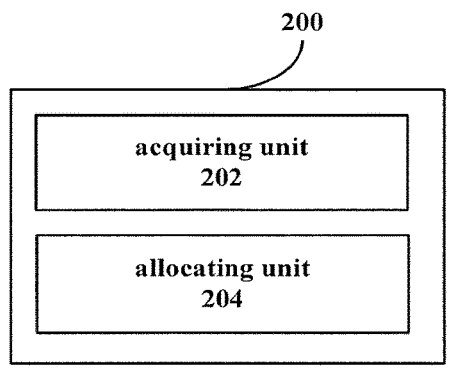
FIG. 2 is a block diagram illustrating an example of functional configuration of a spectrum coordinator according to an embodiment of the present disclosure.
Figure 3:
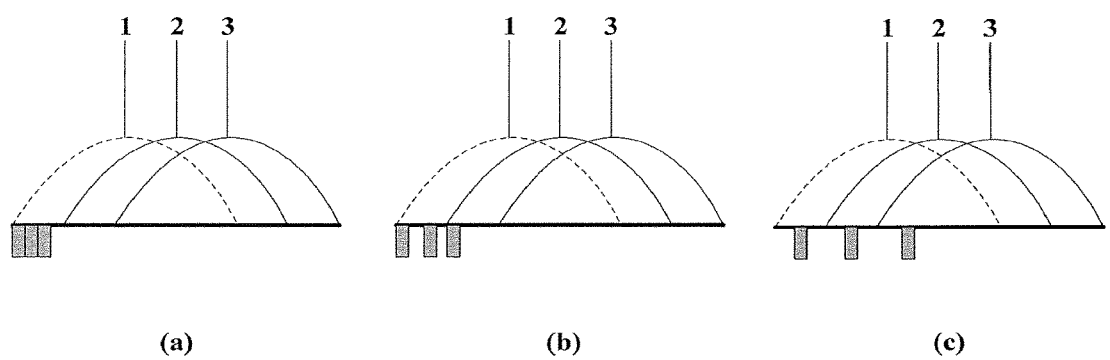
FIG. 3(a) to FIG. 3(c) are diagrams illustrating different resource allocation status of the shared radio transmission resources according to an embodiment of the present disclosure.

Next, an example of functional configuration of a spectrum coordinator according to an embodiment of the present disclosure is described with reference to FIG. 2. FIG. 2 is a block diagram illustrating an example of functional configuration of a spectrum coordinator according to an embodiment of the present disclosure.

Referring to FIG. 2, a spectrum coordinator 200 according to this embodiment may include an acquiring unit 202 and an allocating unit 204. The spectrum coordinator (hereinafter also abbreviated as SC) 200 may be used for coordinating use of shared radio transmission resources by multiple systems. The functional configuration examples of the respective units are described in detail below.

The acquiring unit 202 may be configured to acquire use status of the shared radio transmission resources.

The allocating unit 204 may be configured to allocate, according to the acquired use status, the shared radio transmission resources to communication equipment based on influence of to-be-allocated resource elements of one system of the plurality of systems on available resource elements of other system in the plurality of systems, where a resource allocation granularity of the one system is finer than a resource allocation granularity of the other system. Preferably, the allocating unit may further allocate the shared radio transmission resources to communication equipment in the one system of the plurality of systems based on a resource request from the communication equipment in the one system.

Preferably, as an example, the one system may be an LTE system, which has a resource allocation granularity based on a time-frequency resource block (e.g., the above PRB), and the resource element is PRB for example. The other system may be one or more of a WI-FI system, a broadcast television system, a radar system and an infrared system. For the WI-FI system, the resource allocation granularity is based on a sub-channel having a predetermined bandwidth (e.g., the sub-channel having the bandwidth of 22 MHz in the frequency band of 2.4 GHz), and the resource element is the sub-channel for example. It should be understood that, although the disclosed technique is described by taking the coexistence of the LTE system and the WI-FI system as an example, the technique is not limited thereto but can be obviously applied to any case of coexistence of other two or more systems.

Furthermore, the spectrum shared by the WI-FI system and the LTE system is simply referred to as LAA spectrum hereinafter, and a device in the LTE system which supports LAA technology is referred to as an LAA device. In addition, it should be noted that, in this example, the WI-FI system has a high priority of using the LAA spectrum, and thus when actually performing resource allocation, it should be preferentially ensured the use of the LAA spectrum by the WI-FI system. However, this is only an example, and the disclosed technique may be also applied to a scene in which multiple systems having no difference in priorities of using the spectrum resource coexist. In this case, the shared spectrum resources can still be allocated based on influence of a system having a fine resource allocation granularity on resource availability of a system having a rough resource allocation granularity.

Preferably, the acquiring unit 202 may be configured to acquire the use status in at least one of the following manners: information interacting, spectrum sensing and broadcast querying. In the following, how the acquiring unit 202 acquires the use status of the LAA spectrum by the WI-FI device and the LAA device is described in detail.

Specifically, the acquiring unit 202 may be configured to acquire the use status of the LAA spectrum by the WI-FI device in the following ways. In a first way, the SC 200 interacts with a spectrum management database for WI-FI (e.g., they are interconnected via backhaul), in which the spectrum management database comprises real-time spectrum use conditions of WI-FI devices at different geographical locations and can acquire the spectrum use conditions according to geographical location information. In a second way, the SC 200 per se has a function of spectrum sensing, such that the acquiring unit 202 can detect whether the LAA frequency band is occupied by a WI-FI device by means of spectrum sensing. Furthermore, spectrum sensors equipped for the SC 200 may be distributed in a target management region, such that the acquiring unit 202 can acquire, through the spectrum sensors, the LAA spectrum occupancy condition of the WI-FI devices around the spectrum sensors. In a third way, the SC 200 may broadcast a status information inquiry, and after receiving the inquiry, the WI-FI device may feedback its LAA spectrum use status. For example, user equipment is equipped with a multi-mode chip to support information interaction between different radio technologies. Furthermore, with the development of virtualization technology (such as virtual functional network (VFN)), the information interaction between different radio technologies may be realized by a common virtualization platform.

Furthermore, the acquiring unit 202 may be configured to acquire the use status of the LAA spectrum of the LAA device in the following ways. A first way is information interaction, in which the LAA device notifies the SC 200 of information on used spectrum and released spectrum, such that the SC 200 maintains the use status of the LAA spectrum of the LAA device. The information interaction may be performed via a Uu interface signaling in LTE, such as a physical uplink control channel (PUCCH) and a physical downlink control channel (PDCCH). In a second way, the use status of the LAA spectrum of the LAA device may be acquired by the above spectrum sensing method.

In order to allocate the spectrum resources more precisely, the acquired use status may include not only the occupied frequency band of the LAA spectrum, but also a type of the device occupying the frequency band (i.e., whether it is a WI-FI device or a LAA device). In addition, in a case that LAA spectrum is occupied by the LAA device, the use status may also include the number of the LAA devices occupying the LAA spectrum. The LAA devices may share the same resource block of the LAA spectrum, which may be a case that cellular users from the same cell share resources with D2D (device to device) users, or a case that cellular users from different cells share resources with D2D users in various combinations, or a case cellular users from different operators share resources with D2D users in various combinations, or other cases.

The resource request sent to the SC 200 by the communication equipment in the LTE system (i.e., the LAA device) may be defined according to a QoS (Quality of Service) requirement of the equipment itself, which may include at least one of a traffic requirement, geographical location information and a resource use priority. For example, the LAA device may include the traffic requirement in the resource request to request the SC 200 for the number of available spectrum resources, or the LAA device may include its geographical location information in the resource request to acquire more accurate available spectrum information. Furthermore, if further selection from the available spectrum is desired, the LAA device may additionally include information on the resource use priority (such as a spectrum sequence request) in the resource request, such that the SC 200 sorts the available spectrum resources according to the priority information and informs a sequence of available spectrum resources to the LAA device. It should be noted that, the resource request may be also a spectrum sensing request. In this case, the SC 200 may for example allocate a set of or a sequence of sensing spectrum resources to the LAA device, such that the LAA device senses whether each PRB in the set or sequence of sensing spectrum resources is occupied.

The total amount of the LAA spectrum resources is constant, thus more spectrum resources the LAA device occupies, less available spectrum resources are left for the WI-FI device. Therefore, when allocating the available spectrum resources to the LAA device, the influence on the WI-FI device in the future may be reduced by restricting the total amount and distribution of the LAA spectrum resources occupied by the LAA device. This is because the use of the LAA spectrum of the WI-FI device and the flexibility of resource allocation in the LTE system should be ensured preferentially in this case. In addition, since the WI-FI device needs to occupy the whole sub-channel when actually using the resources, different distribution may affect the amount of available spectrum resources for the WI-FI device even if the same amount of spectrum resources are occupied by the LAA device. FIG. 3(a) to FIG. 3(c) are diagrams illustrating examples of different resource allocation status of shared radio transmission resources (i.e., the LAA spectrum) according to embodiments of the present disclosure. As shown in FIG. 3(a) to FIG. 3(c), it is assumed that each gray block represents one PRB, and cases that the same three PRBs are allocated to the LAA device are described. In FIG. 3(a), the three PRBs are continuously arranged to occupy the LAA spectrum, which occupy the spectrum of sub-channel 1 of the WI-FI device (shown with a dashed line), while the spectrum resources of sub-channels 2 and 3 are not occupied and can be used by the WI-FI device. In FIG. 3(b), the three PRBs occupy the spectrum resources of the sub-channels 1 and 2 of the WI-FI device, and therefore only the sub-channel 3 can be used by the WI-FI device. In FIG. 3(c), the three PRBs respectively occupy the spectrum resources of the sub-channels 1, 2 and 3 of the WI-FI device, and therefore no sub-channel can be used by the WI-FI device.

In view of the above, one of premises for selecting available spectrum for the LAA device is to preserve available resources for the WI-FI device. Therefore, preferably, the allocating unit 204 may be further configured to allocate resources to the communication equipment from the to-be-allocated resource elements in a manner that a sum of the number of the available resource elements and the number of occupied resource elements of the other system is not smaller than the number of preserved resource elements of the other system.

It should be noted that, as described above, the WI-FI system has a high priority in using the LAA spectrum, thus the reason why it needs to preserve available resources for the WI-FI device is to avoid unfair resource allocation due to the asymmetry between resource allocation granularities of the two systems. Particularly, the WI-FI system needs to solely occupy a sub-channel with a rough granularity for successful transmission, which sub-channel may be released for reallocation after a maximum occupancy period for transmission expires, while resource allocation in the LTE system is based on a resource block having a finer granularity. Thus, although each resource block is set with a maximum occupancy period to be released for reallocation, there may be a case that at least one of all resource blocks in a sub-channel is occupied by the LAA device at any time, that is, the sub-channel is always occupied completely or partially by the LAA device, resulting in that the whole sub-channel cannot be released completely to be allocated to the WI-FI device. The present disclosure solves this problem. It is to be appreciated that, for the same communication spectrum which is used by a system having a fine granularity and a system having a rough granularity, the number of the used resources of the system having the fine granularity is larger than the number of the used resources the system having the rough granularity. For example, a glass bottle can be filled with more millet having a fine granularity than jujubes having a rough granularity. The larger the number of resource elements of the system having a fine granularity to which resource elements of the system having a rough granularity correspond, the larger the influence on the system having the rough granularity is. Therefore, the larger the difference in resource allocation granularity between two systems is, the better the effect of improving spectrum utilization ratio and ensuring the fairness of resource allocation between the systems by the present technology is. Specifically, it is supposed that the number of available sub-channels preserved for the WI-FI device is denoted as Nres, and in a case the preservation is satisfied, available frequency bands may be selected for the LAA device in an ascending order of the influence on the WI-FI sub-channel and in a descending order of the performance of the LAA devices. Furthermore, the number of the preserved sub-channels Nres may vary dynamically. For example, in different time periods during a day and at different locations, an average arrival rate of the WI-FI devices may vary, and thus the available resources may be preserved for the WI-FI devices according to the variation to ensure an access rate of the WI-FI devices.

The LAA spectrum may be classified into the following three types according to the influence on the WI-FI sub-channel and whether being occupied by the LAA device.

A first type: an idle frequency band which will not increase the influence on the WI-FI sub-channel if being occupied by the LAA device.

A second type: an idle frequency band which will increase the influence on the WI-FI sub-channel if being occupied by the LAA device.

A third type: a frequency band, which has been occupied by the LAA device and will not increase the influence on the WI-FI sub-channel, but needs to support the resource reuse between LAA devices and needs interference control.

Although the above three types of LAA spectrum have been mainly discussed in the embodiments of the present disclosure, the LAA spectrum may further include a fourth type, i.e., a frequency band which has been occupied by the LAA device but is not totally used and thus allows access of other devices. In a case of allocating the frequency band of this type to the LAA device, the influence on the WI-FI sub-channel will not be increased, but it needs to consider whether the LAA device is authorized to use these resources and a rule of being authorized to use these resources.

As can be seen from the above types into which the LAA spectrum is classified, the first type of resources has the highest priority, because it will not increase the influence on the WI-FI sub-channel and there is no interference between devices. In view of the influence on the WI-FI sub-channel, the second type of resources has the lowest priority. In addition, in view of use efficiency, the third type of resources has the lowest priority. In practice, the three types of resources are selected by considering actual requirements and the resource request from the LAA device in combination.

It is to be understood that for convenience of illustration, an exemplary scene including the LTE system and WI-FI system is described, in which the WI-FI system has a larger resource allocation granularity than the LTE system. However, other systems, such as a broadcast television system, a radar system and an infrared system may be also included. In a case of coexistence of two systems, the resource allocation granularities of the two systems need to be considered, and in a case of coexistence of three or more systems, it needs to rank the resource allocation granularities of these systems and to perform selection and allocation according to the ranking.

It is to be understood that, in implementation, a system may have a priority in using the shared resources. That is, the system may preferentially use the shared resources according to its priority in using the shared resources, while considering its resource allocation granularity.

As shown in FIG. 1A, start points and end points of WI-FI sub-channels divide the LAA spectrum into multiple bands, which are referred to as unit bands (5 MHz) Resources in the same unit band have the same impact on the WI-FI sub-channel. Therefore, the above three types may be further denoted as follows.

A first type: an idle frequency band, located in the same unit band as a band having been occupied by the LAA device.

A second type: an idle unit band.

A third type: a frequency band having been occupied by the LAA device.

The allocating unit 204 may allocate the three types of resources to the LAA device in any combination, as long as the following conditions are met.

For the first type, sufficient available spectrum resources are selected to be allocated to the LAA device according to the QoS requirement of the LAA device.

For the second type, since this type of resources may increase the influence on the WI-FI sub-channel, it needs to ensure that a sum of the number of the available WI-FI sub-channels which are left after selection and the number of the sub-channels having been occupied by the WI-FI is not less than Nres.

For the third type, the resources of this type may be allocated to a new LAA device, as long as resource reuse between LAA devices is supported. Meanwhile, interference control is needed.

Preferably, the allocating unit 204 may be further configured to allocate resources to the communication equipment according to a resource use habit of the other system to reduce resource use collision with the other system. As a preferred example, the allocating unit 204 preferentially allocates resources having a low probability of being occupied by the other system to the communication equipment.

Specifically, when allocating a sequence of available spectrums (that is, the sequence of available spectrums are arranged in an order of use priority) to the LAA device, the LAA spectrum occupancy status and the resource use habit (for example, several sub-channels which are usually occupied or unused) of the WI-FI device may be considered to reduce collision. Based on this, the above three types are further restrained as follows, such that the selected spectrum units (i.e., the resource elements, such as PRBs) form the sequence of available spectrums in order.

Firstly, resources may be sequentially selected in an order of the above three types. Only when one type of resources do not exist or the requirement of the LAA device can not be satisfied after selection of one type of resources, a next type of resources may be selected.

For the second type, the unit bands may be ranked according to the number of WI-FI sub-channels influenced by the unit bands in an ascending order, and the available spectrum is allocated to the LAA device in this order.

For the third type, the spectrum units (such as PRBs) are ranked according to the number of the LAA devices which have already occupied the respective spectrum units in an ascending order, and the available spectrum is allocated to the LAA device in this order.

Furthermore, the band having a low probability of being occupied by the WI-FI device may be preferentially selected to reduce the overhead for releasing the resources for the WI-FI device.

Furthermore, it is to be understood that the occupied resource elements located in the same sub-channel (more specifically, in the same unit band for example) as the to-be-allocated resources elements of the LTE system also produce influence on the resource allocation. Therefore, preferably, the allocating unit 204 may be further configured to allocate resources to the communication equipment from the to-be-allocated resource elements according to use conditions of occupied resource elements of the one system, which correspond to the same resource element of the other system as the to-be-allocated resource elements.

Specifically, as an example, it is assumed sub-channel 1 of the WI-FI system includes the to-be-allocated resource element PRB1 and the occupied resource element PRB2 of the LTE system, and sub-channel 2 of the WI-FI system includes the to-be-allocated resource element PRB3 and the occupied resource element PRB4 of the LTE system. Since the WI-FI device needs to occupy the whole sub-channel in actual use, in selecting the resources to be allocated to the LAA device from the to-be-allocated resource elements PRB1 and PRB3 according to the influence on the available WI-FI sub-channel, it also needs to consider the use conditions of the occupied resource elements PRB2 and PRB4. For example, if the PRB2 has been occupied for long time and its use period is about to expire, while the PRB4 has been occupied for short time and the remaining use time is still long, the PRB3 is preferentially allocated to the LAA device. Otherwise, if the PRB1 is selected, the sub-channel 1 will be continuously occupied and cannot be used by the WI-FI device, even in a case that the sub-channel 1 shall be released soon to be used by the WI-FI device, thereby increasing the influence on the WI-FI sub-channel in the future as compared with the case of selecting the PRB3.

Further preferably, the allocating unit 204 may be configured to determine a use period of the resources allocated to the communication equipment according to a use period of the occupied resource elements of the one system.

Specifically, for example, in order to avoid the case that a LAA band is always occupied by the LAA device and thus the priority of using the LAA band by the WI-FI device is influenced, and in order to ensure the fairness of resource use, a use period needs to be defined for the LAA device occupying the LAA band. In addition, the definition of the use period also provides an effective control method for releasing resources for the WI-FI system, whereby the LAA device may automatically release the occupied resources when the use period expires, thereby reducing signaling overhead. The use period may be a preset fixed value Tmax, or may be dynamically selected according to the occupancy conditions of the LAA device.

For example, if some PRBs in a unit band have been occupied by some LAA devices currently the maximum remaining use time of these PRBs is denoted as $T_{rest}^{max}$, and the number of influenced WI-FI sub-channels can be reduced if this unit band is released, then a maximum available time (i.e., the use period) of other available PRBs in the unit band, when being allocated to other LAA devices currently, may be set as $T_{rest}^{max}$, such that the LAA devices will occupy the LAA spectrum in the set use period.

Figure 4:
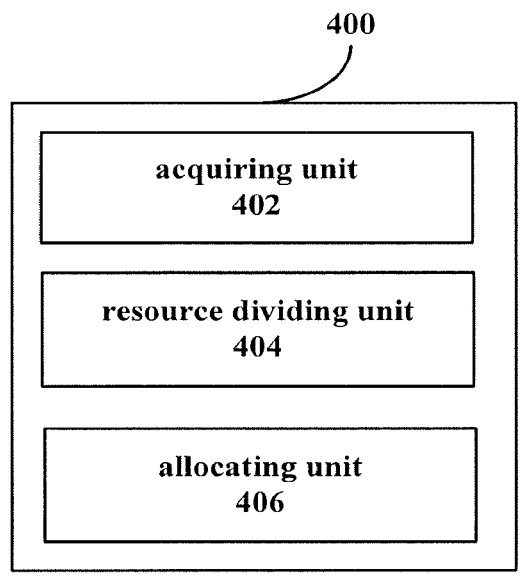
FIG. 4 is a block diagram illustrating an example of functional configuration of a spectrum coordinator according to another embodiment of the present disclosure.

Next, an example of functional configuration of a spectrum coordinator according to another embodiment of the present disclosure is described with reference to FIG. 4. FIG. 4 is a block diagram illustrating an example of functional configuration of a spectrum coordinator according to another embodiment of the present disclosure.

As shown in FIG. 4, a spectrum coordinator 400 according to this embodiment may include an acquiring unit 402, a resource dividing unit 404 and an allocating unit 406. The acquiring unit 402 and the allocating unit 406 have substantially the same functional configurations as those of the acquiring unit 202 and the allocating unit 204 described above with reference to FIG. 2, which are not repeated herein. Only the functional configuration example of the resource dividing unit 404 is described in detail below.

The resource dividing unit 404 may be configured to divide the shared radio transmission resources based on influence of the one system on resource availability of the other system, such that the allocating unit 406 may be further configured to allocate resources to the communication equipment according to the dividing of the shared radio transmission resources.

The spectrum division aims to reduce the influence of the one system on the spectrum availability of the other system as much as possible. The so-called availability can be described as the number of the resource elements which can be allocated. Specifically, the strategy of the spectrum division needs to ensure that, when any resource element of one system is occupied by a device in this system, the number of the available resource elements for the other system can be maximized.

Preferably, as an example, the resource dividing unit 404 may divide the shared radio transmission resources in a manner that a resource element of the one system is aligned with a resource element of the other system, to reduce the influence of the one system on resource availability of the other system.

As shown in FIG. 1A, in the scene in which the WI-FI system and the LTE system coexist, a result of the aligning is that the interval of 5 MHz between central frequency points of adjacent WI-FI channels is divided into continuous 25 PRBs in the LTE. In this way, when subsequently performing the resource allocation, the influence of the LTE system on the resource availability of the WI-FI system can be reduced as much as possible.

It should be noted that, the above spectrum coordinator may be implemented in a base station in the one system. Particularly, the spectrum coordinator may be implemented in an eNB (evolved Node B) in the LTE system. In the above scene in which the WI-FI system and the broadcast television system coexist, the spectrum coordinator may be implemented as for example a geolocation database, which provides available television band resources for the WI-FI system, in the ETSI RRS standard. Next, an example of functional configuration of a spectrum coordinator in this case is described with reference to FIG. 5.

Figure 5:
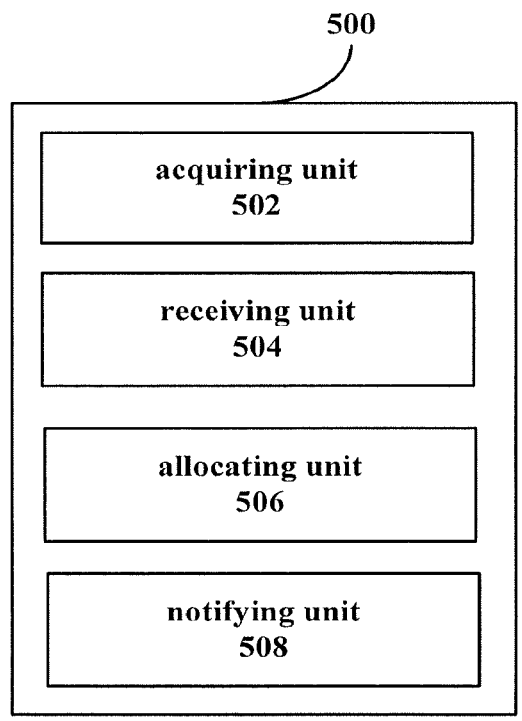
FIG. 5 is a block diagram illustrating an example of functional configuration of a spectrum coordinator according to another embodiment of the present disclosure.

FIG. 5 is a block diagram illustrating an example of functional configuration of a spectrum coordinator according to another embodiment of the present disclosure.

As shown in FIG. 5, a spectrum coordinator 500 according to this embodiment may include an acquiring unit 502, a receiving unit 504, an allocating unit 506 and a notifying unit 508. The acquiring unit 502 and the allocating unit 506 have substantially the same functional configurations as those of the acquiring unit 202 and the allocating unit 204 described above with reference to FIG. 2, which are not repeated herein. Only the functional configuration examples of the receiving unit 504 and the notifying unit 508 are described in detail below.

The receiving unit 504 may be configured to receive a resource request from the communication equipment in the one system. Preferably, the receiving unit 504 may further receive information on resources selected to be used from the allocated resources by the communication equipment in the one system, such that the spectrum coordinator 500 updates and maintains for example the use status of the LAA spectrum of the LAA device.

The notifying unit 508 may be configured to notify the allocated resources (for example, a set or sequence of available resources, or a set or sequence of sensing spectrums) to the communication equipment. Furthermore, the notifying unit 508 may notify the use period determined above to the communication equipment, such that the communication equipment may use the spectrum resources selected form the allocated resources for communication during the use period.

Figure 6:
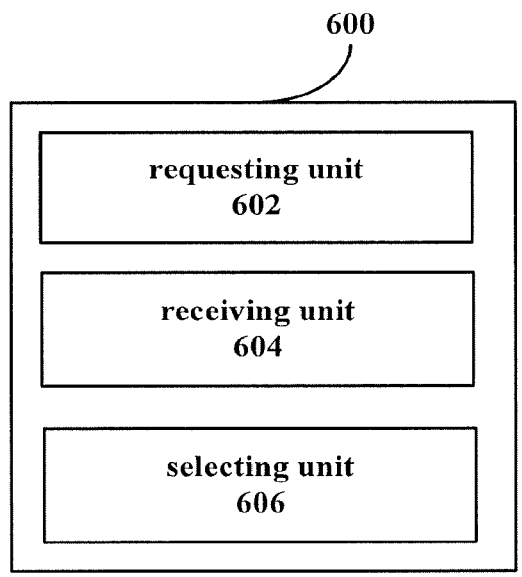
FIG. 6 is a block diagram illustrating an example of functional configuration of a device in a wireless communication system according to an embodiment of the present disclosure.

FIG. 6 is a block diagram illustrating an example of functional configuration of a device in a wireless communication system according to an embodiment of the present disclosure.

As shown in FIG. 6, a device 600 according to the embodiment may include a requesting unit 602, a receiving unit 604 and a selecting unit 606. A functional configuration example of each unit is described in detail below.

The requesting unit 602 may be configured to send a resource request to the spectrum coordinator. As described above, the resource request may include at least one of a traffic requirement, geographical location information and a resource use priority. The spectrum coordinator is used for coordinating use of shared radio transmission resources by a plurality of systems including the wireless communication system.

The receiving unit 604 may be configured to receive resources allocated by the spectrum coordinator in response to the resource request. The allocated resources are allocated by the spectrum coordinator based on influence of to-be-allocated resource elements of the wireless communication system on available resource elements of other system in the plurality of systems. A resource allocation granularity of the wireless communication system is finer than a resource allocation granularity of the other system. Preferably, the wireless communication system may be the LTE system, which has a resource allocation granularity based on a time-frequency resource block (e.g., the above PRB), and the other system may be one or more of a WI-FI system, a broadcast television system, a radar system and an infrared system. For the WI-FI system, the resource allocation granularity is based on a sub-channel having a predetermined bandwidth.

Preferably, the receiving unit 604 further receives a use period of the allocated resources from the spectrum coordinator.

The selecting unit 606 may be configured to select resources to be used from the allocated resources according to a service quality requirement. Specifically, the selecting unit 606 may be configured to randomly select resources to be used from the set of the allocated resources according to a QoS requirement, or to sequentially select resources to be used from the sequence of the allocated resources.

It is to be understood that the device 600 may be located in user equipment or a base station of a small cell or other infrastructures in the LTE system, which is not limited in this disclosure.

Figure 7:
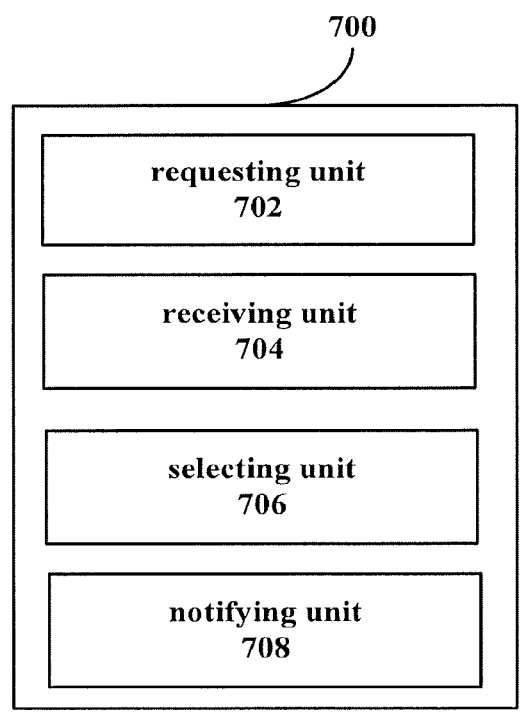
FIG. 7 is a block diagram illustrating an example of functional configuration of a device in a wireless communication system according to another embodiment of the present disclosure.

FIG. 7 is a block diagram illustrating an example of functional configuration of a device in a wireless communication system according to another embodiment of the present disclosure.

As shown in FIG. 7, a device 700 according to the embodiment may include a requesting unit 702, a receiving unit 704, a selecting unit 706 and a notifying unit 708. The requesting unit 702, the receiving unit 704 and the selecting unit 706 have substantially the same functional configurations as those of the requesting unit 602, the receiving unit 604 and the selecting unit 606 described above with reference to FIG. 6, which are not repeated herein. Only the functional configuration example of the notifying unit 708 is described in detail below.

The notifying unit 708 may be configured to notify information on the resources to be used selected by the selecting unit 706 to the spectrum coordinator, such that the spectrum coordinator updates and maintains the use status of LAA spectrum of the LAA device.

It should be noted that the above resource request may be also a spectrum sensing request, such that the spectrum coordinator allocates a set or sequence of sensing spectrums in response to the received spectrum sensing request. An example of functional configuration of a device in a wireless communication system in this case is described with reference to FIG. 8.

Figure 8:
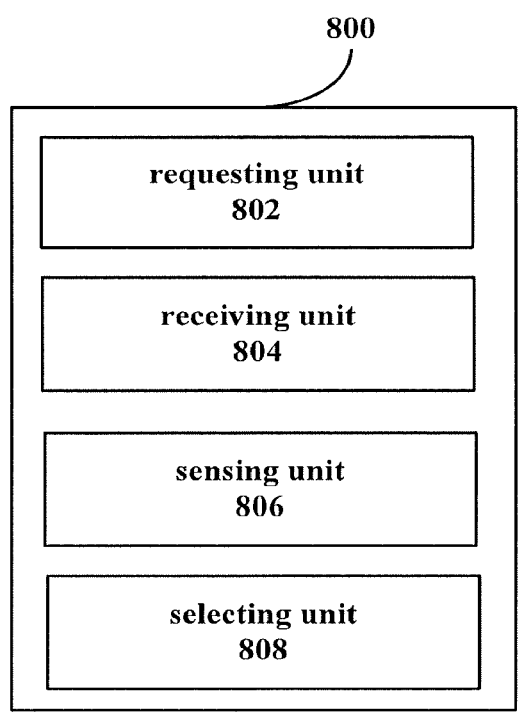
FIG. 8 is a block diagram illustrating an example of functional configuration of a device in a wireless communication system according to another embodiment of the present disclosure.

FIG. 8 is a block diagram illustrating an example of functional configuration of a device in a wireless communication system according to another embodiment of the present disclosure.

As shown in FIG. 8, a device 800 according to the embodiment may include a requesting unit 802, a receiving unit 804, a sensing unit 806 and a selecting unit 808. The requesting unit 802, the receiving unit 804 and the selecting unit 808 have substantially the same functional configurations as those of the requesting unit 602, the receiving unit 604 and the selecting unit 606 described above with reference to FIG. 6, which are not repeated herein. Only the functional configuration example of the sensing unit 806 is described in detail below.

The sensing unit 806 may be configured to sense the allocated resources. Specifically, the sensing unit 806 may sense the set of sensing spectrums in a random order, while may sense the sequence of sensing spectrum in a sequential order, and determine whether the resource can be occupied according an actual QoS requirement. Particularly, for the above first and second types of resources, if it is determined by means of the spectrum sensing that the resources are not used by other users, it is determined that these resources can be occupied by the LAA device; while for the third type of resources, it may be determined by means of the spectrum sensing whether influence of the LAA device having occupied the resources on the LAA device which has sent the request is in a tolerable range, so as to determine whether to occupy the resources.

The selecting unit 808 may be further configured to select the resources to be used from the allocated resources according to a sensing result in combination with the QoS requirement.

It should be understood that, although the examples of the functional configurations of the spectrum coordinator and the device in the wireless communication system according to the embodiments of the present disclosure are described above, these are only examples rather than limitation. Those skilled in the art can modify the embodiments according to the principle of the disclosure, for example, add, delete and/or combine, or the like, a functional module in each of the embodiments, and all of such modifications fall within the scope of the present disclosure.

Corresponding to the above device embodiments, an example of a signaling interaction procedure between a spectrum coordinator and a device in a wireless communication system according to an embodiment of the present disclosure is described with reference to FIG. 9 to FIG. 11. It should be noted that, the following embodiments are described by taking an interaction between a SC and an LAA device as an example, but the present disclosure is not limited thereto. The LAA device can be replaced by communication equipment in a system other than the LTE system.

Figure 9:
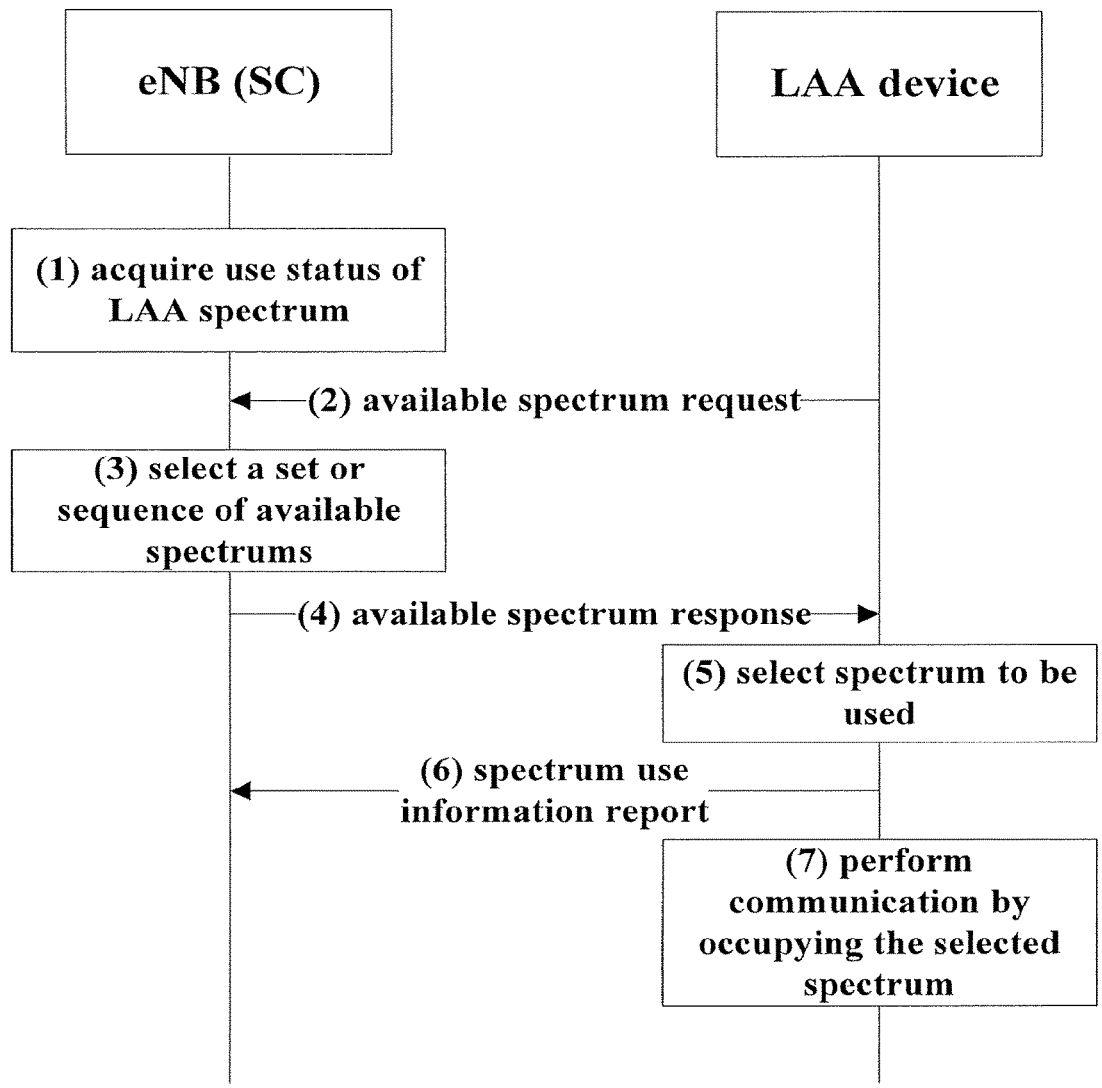
FIG. 9 is a flowchart illustrating a first example of a signaling interaction procedure between a spectrum coordinator and a device in a wireless communication system according to an embodiment of the present disclosure.

FIG. 9 is a flowchart illustrating a first example of a signaling interaction procedure between a spectrum coordinator and a device in a wireless communication system according to an embodiment of the present disclosure.

In the example shown in FIG. 9, the SC may be a functional module located in the eNB, and the signaling interaction between the SC and the LAA device may be performed via an LTE Uu interface for example.

As shown in FIG. 9, firstly, in step (1), the SC acquires the use status of the LAA spectrum as described above. Next, in step (2), the LAA device sends an available resource request to the SC, which request may be transmitted via PUCCH. In step (3), the SC allocates a set or sequence of available resources to the LAA device in the above-described manner, and sends an available resource response to the LAA device in step (4), so as to inform the LAA device of the allocated set or sequence of available resources and the use period of each of the PRBs. This response may be transmitted via PDCCH. Next, in step (5), the LAA device may select spectrum resources to be used from the set or sequence available resources according to an actual QoS requirement, and report to the SC information on the spectrum resources selected to be used in step (6), such that the SC updates and maintains the use status of the LAA spectrum of the LAA device. The reported information may be transmitted via PUCCH. Finally, in step (7), the LAA device may perform communication by occupying the selected spectrum resources within the defined use period.

Next, a second example of a signaling interaction procedure between a spectrum coordinator and a device in a wireless communication system according to an embodiment of the present disclosure is described with reference to FIG. 10. FIG. 10 is a flowchart illustrating a second example of a signaling interaction procedure between a spectrum coordinator and a device in a wireless communication system according to an embodiment of the present disclosure.

Figure 10:
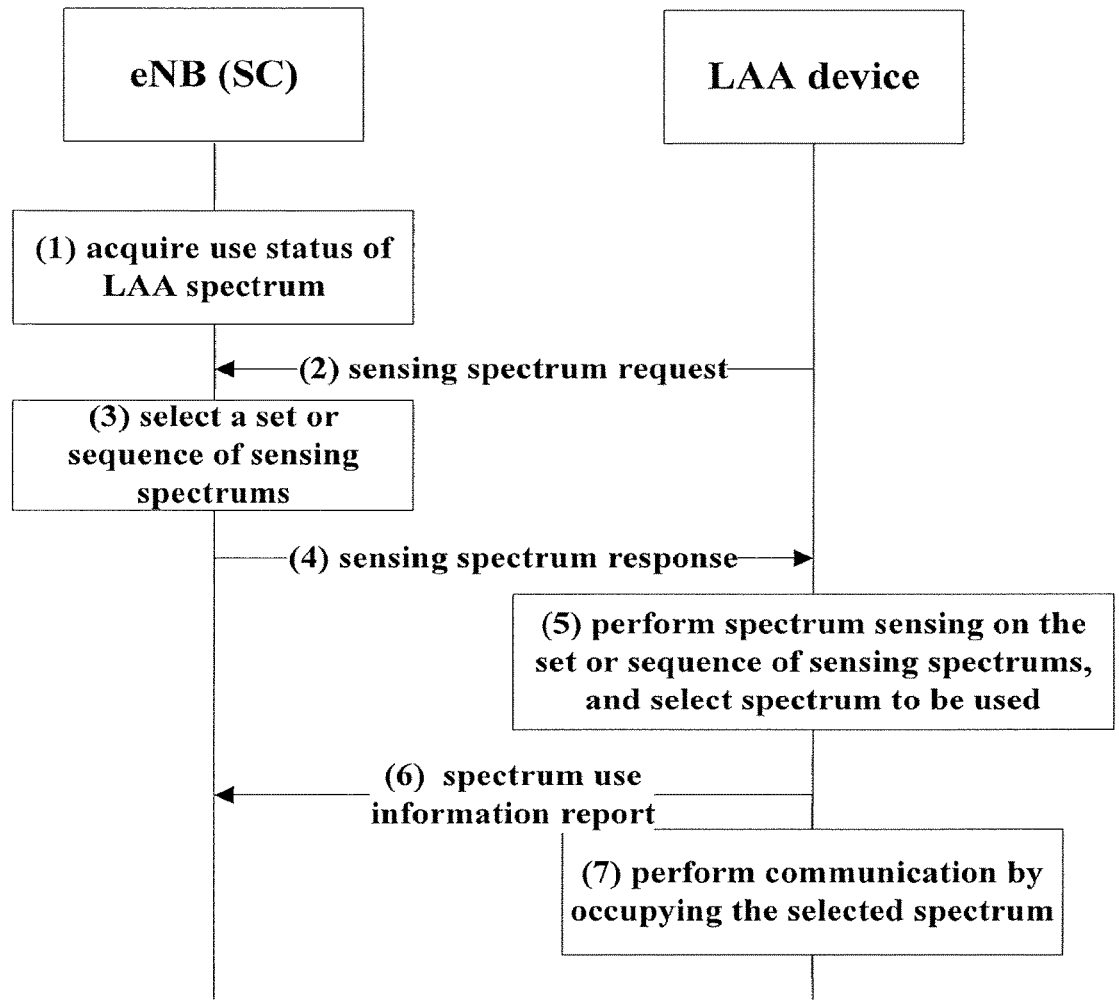
FIG. 10 is a flowchart illustrating a second example of a signaling interaction procedure between a spectrum coordinator and a device in a wireless communication system according to an embodiment of the present disclosure.

In the example shown in FIG. 10, the SC may be a functional module located in an eNB, and the signaling interaction between the SC and the LAA advice may be performed via an LTE Uu interface.

The signaling interaction procedure shown in FIG. 10 is substantially the same as that shown in FIG. 9 except that, in step (2), the LAA device sends a sensing spectrum request to the SC, such that the SC allocates a set or sequence of sensing spectrums to the LAA device in step (3) and sends a sensing spectrum response to the LAA device in step (4), and the LAA device senses the set or sequences of sensing spectrums to select spectrum resources to be used according to an actual QoS requirement. Processing in other steps in FIG. 10 is substantially the same as that in corresponding steps in FIG. 9, which are not repeated herein.

Next, a third example of a signaling interaction procedure between a spectrum coordinator and a device in a wireless communication system according to an embodiment of the present disclosure is described with reference to FIG. 11. FIG. 11 is a flowchart illustrating a third example of a signaling interaction procedure between a spectrum coordinator and a device in a wireless communication system according to an embodiment of the present disclosure.

Figure 11:
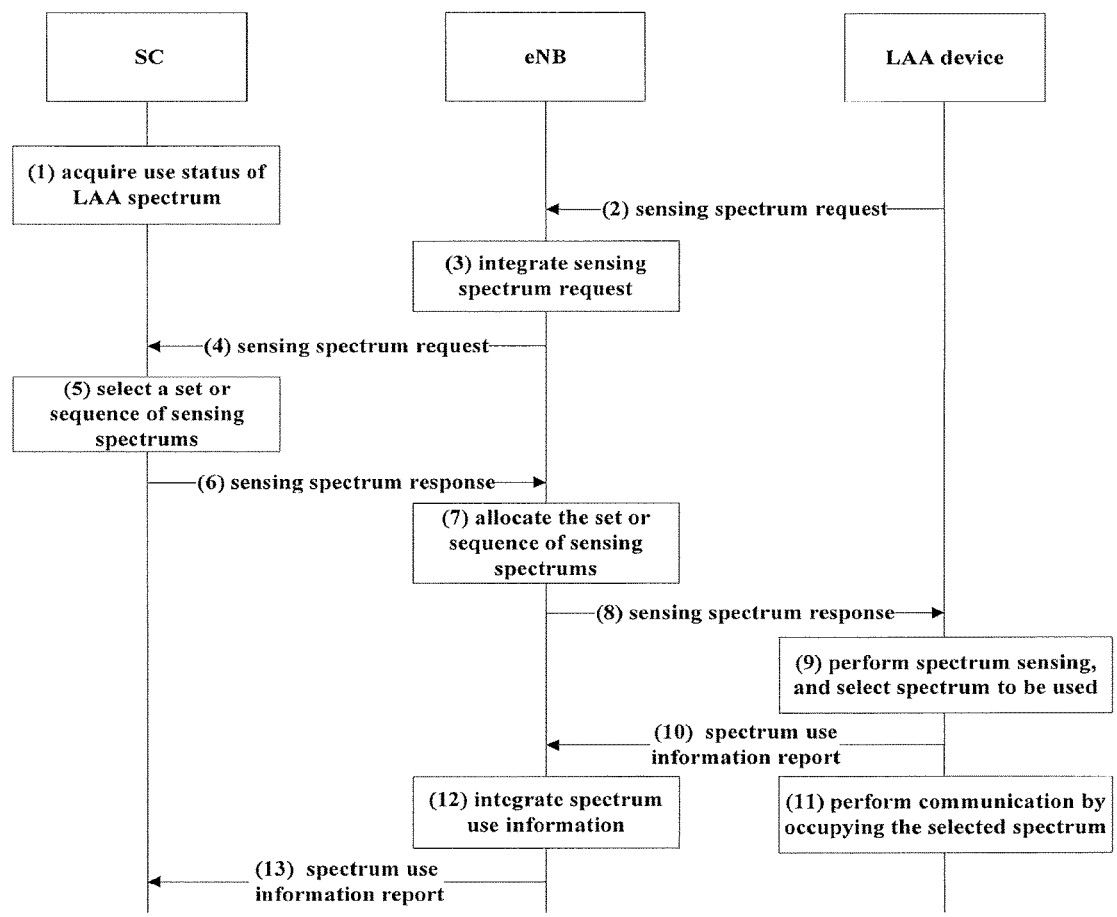
FIG. 11 is a flowchart illustrating a third example of a signaling interaction procedure between a spectrum coordinator and a device in a wireless communication system according to an embodiment of the present disclosure.

In the example of FIG. 11, the SC is located in a core network (e.g. the Evolved Packet Core (EPC)) or in a cloud at a higher level to control LAA devices in multiple eNBs. The SC interacts with each of the eNBs via an S1 interface, and each of the eNBs interacts with an LAA device via a Uu interface.

As shown in FIG. 11, firstly, in step (1), the SC acquires the use status of the LAA spectrum. Next, in step (2), the LAA device sends a spectrum sensing request to the eNB, which may be transmitted via PUCCH. In step (3), the eNB integrates the spectrum sensing requests from multiple LAA devices, that is, sends the spectrum sensing requests from the LAA devices to the SC at a preset time interval. Therefore, such spectrum allocation manner can be regarded as a semi-static manner. Next, in step (4), the eNB sends the integrated spectrum sensing requests to the SC via the S1 interface. In step (5), the SC allocates a set or sequence of sensing spectrums according to the request in the above manner, and sends the spectrum sensing response to the eNB via the S1 interface in step (6), to inform the eNB of the allocated set or sequence of sensing spectrums and the use period of each of the PRBs. In step (7), the eNB further allocates the set or sequence of sensing spectrums to each of the LAA devices, and sends the allocation result to each LAA device using the spectrum sensing response in step (8), which response may be transmitted via PDCCH. Next, in step (9), the LAA device senses the set of sensing spectrums in a random order or sequentially senses the sequence of sensing spectrums, and selects spectrum resources to be used according to an actual QoS requirement. Then the LAA device reports the information on the selected spectrum resources to the eNB in step (10), which information may be transmitted via PUCCH. In step (11), the LAA device performs communication by occupying the selected spectrum resources within the use period. The eNB integrates the information reported by the LAA devices in step (12), and informs the SC of the integrated information via the S1 interface in step (13), such that the SC updates and maintains the use status of the LAA spectrum of the LAA device.

It is to be understood that the integration operations in the above step (3) and step (12) are optional. The eNB may not integrate the information, but directly report to the SC the information from the LAA device upon receipt.

In addition, in view of a long time delay of the information interaction via the S1 interface, a frequency at which the eNB requests the SC for the sensing spectrums may be reduced. That is, the eNB requests the SC for a frequency band according to the system capacity and user traffic and occupies the resources for a long time period, during which the eNB only allocates the spectrum resources in this frequency band to the LAA device for sensing and using. In a next period, the eNB may request for a new band and a use period.

In addition, it should be noted that, although the case that the SC allocates the set or sequence of sensing spectrums to the LAA device has been described above with reference to FIG. 11, the signaling interaction procedure described with reference to FIG. 11 is also applicable to the case that the SC directly allocates a set or sequence of available spectrums to the LAA, which is not repeated herein.

It is to be understood that although the examples of the signaling interaction procedure between the spectrum coordinator and the LAA device according to the embodiments of the present disclosure have been described above with reference to FIG. 9 to FIG. 11, the present disclosure is not limited thereto and a person skilled in the art may modify the above described procedure according to the principle of the present disclosure.

Figure 12:
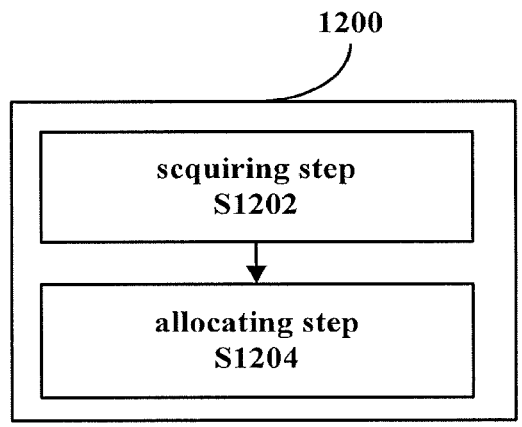
FIG. 12 is a flowchart illustrating a process example of a spectrum coordination method according to an embodiment of the present disclosure.

Corresponding to the device according to the embodiment of the present disclosure, a spectrum coordination method is further provided. A process example of a spectrum coordination method according to an embodiment of the present disclosure is described with reference to FIG. 12 below. FIG. 12 is a flowchart illustrating a process example of a spectrum coordination method according to an embodiment of the present disclosure.

As shown in FIG. 12, a spectrum coordination method 1200 according to the present disclosure may include an acquiring step S1202 and an allocating step S1204.

In the acquiring step S1202, use status of the shared radio transmission resources is acquired.

Next, in the allocating step S1204, the shared radio transmission resources may be allocated to communication equipment based on influence of to-be-allocated resource elements of one system of the plurality of systems on available resource elements of other system in the plurality of systems according to the use status. A resource allocation granularity of the one system is finer than a resource allocation granularity of the other system. Preferably, the one system may be an LTE system, and the other system may be one or more of a WI-FI system, a broadcast television system, a radar system and an infrared system. The detailed process of resource allocation may be referred to the above description at corresponding positions in the device embodiments, which is not repeated herein.

Figure 13:
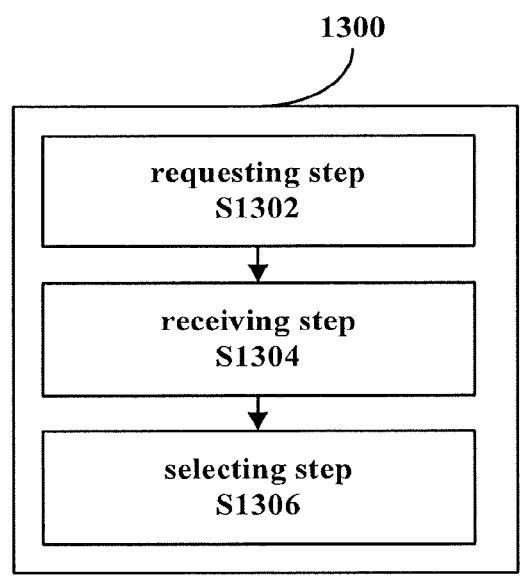
FIG. 13 is a flowchart illustrating a process example of a method in a wireless communication system according to an embodiment of the present disclosure.

FIG. 13 is a flowchart illustrating a process example of a method in a wireless communication system according to an embodiment of the present disclosure.

As shown in FIG. 13, a method 1300 according to the embodiment may include a requesting step S1302, a receiving step S1304 and a selecting step S1306.

First, in the requesting step 1302, a resource request is sent to the spectrum coordinator. The spectrum coordinator is used for coordinating use of shared radio transmission resources by a plurality of systems including the wireless communication system.

Next, in the receiving step S1304, resources allocated by the spectrum coordinator in response to the resource request are received. The allocated resources are allocated by the spectrum coordinator based on influence of to-be-allocated resource elements of the wireless communication system on available resource elements of other system in the plurality of systems. A resource allocation granularity of the wireless communication system is finer than a resource allocation granularity of the other system.

Then, in the selecting step S1306, resources to be used are selected from the allocated resources according to a service quality requirement.

The detailed process may be referred to the above description at corresponding positions in the device embodiments, which is not repeated herein.

It should be noted that, although the process examples of the spectrum coordination method and the method in the wireless communication system according to embodiments of the present disclosure have been described above, these are only examples rather than limitation. Those skilled in the art can modify the embodiments according to the principle of the present disclosure, for example, add, delete or combine or the like a step in each of the embodiments, and all of such modifications fall within the scope of the present disclosure.

Furthermore, it should be noted that the method embodiments correspond to the above device embodiments, and thus for the contents in the method embodiments which are not described in detail, one may refer to the description at corresponding positions in the device embodiments, which are not repeated herein.

Furthermore, an electronic apparatus is further provided according to an embodiment of the present disclosure. The electronic apparatus may include one or more processors configured to perform the spectrum coordination method and the method in the wireless communication system according to the above embodiments of the present disclosure.

It is to be understood that the machine-executable instructions in a storage medium and a program product according to an embodiment of the present disclosure may be configured to perform a method corresponding to the above device embodiment, and thus for the contents which are not described in detail herein, one may refer to the foregoing description at corresponding positions, which are not repeated herein.

Accordingly, a storage medium on which the above program product storing machine-executable instructions is carried is also included in the present disclosure. The storage medium includes but not limited to a floppy disk, an optical disk, a magneto-optical disk, a storage card, a memory rod and the like.

Furthermore, it shall be noted that the foregoing series of processes and apparatuses can also be embodied in software and/or firmware. In the case of being embodied in software and/or firmware, a program constituting the software is installed from a storage medium or a network to a computer with a dedicated hardware structure, e.g., a general purpose personal computer 1400 illustrated in FIG. 14, which can perform various functions when various programs are installed thereon.

Figure 14:
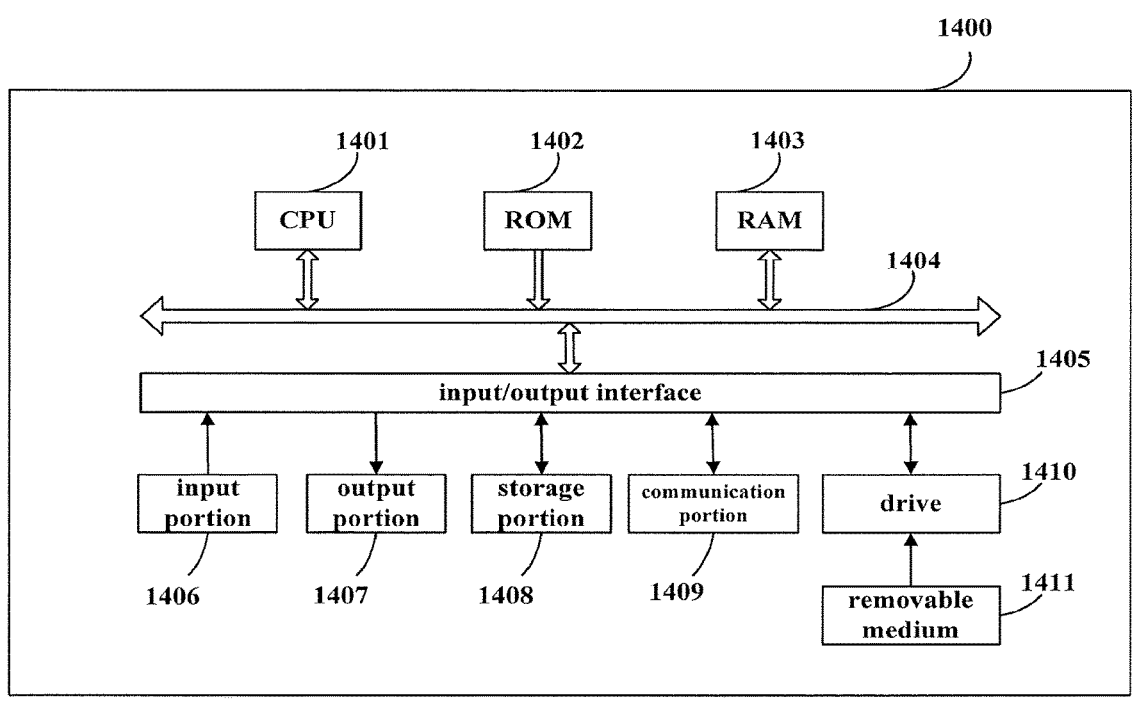
FIG. 14 is a block diagram of an exemplary structure of a personal computer which may function as an information processing device according to an embodiment of the present disclosure.

In FIG. 14, a Central Processing Unit (CPU) 1401 performs various processes according to a program stored in a Read Only Memory (ROM) 1402 or loaded from a storage portion 1408 into a Random Access Memory (RAM) 1403 in which data required when the CPU 1401 performs the various processes is also stored as needed.

The CPU 1401, the ROM 1402 and the RAM 1403 are connected to each other via a bus 1404 to which an input/output interface 1405 is also connected.

The following components are connected to the input/output interface 1405: an input portion 1406 including a keyboard, a mouse, etc.; an output portion 1407 including a display, e.g., a Cathode Ray Tube (CRT), a Liquid Crystal Display (LCD), etc., a speaker, etc.; a storage portion 1408 including a hard disk, etc.; and a communication portion 1409 including a network interface card, e.g., an LAN card, a modem, etc. The communication portion 1409 performs a communication process over a network, e.g., the Internet.

A drive 1410 is also connected to the input/output interface 1405 as needed. A removable medium 1411, e.g., a magnetic disk, an optical disk, an magneto optical disk, a semiconductor memory, etc., can be installed on the drive 1410 as needed so that a computer program fetched therefrom can be installed into the storage portion 1408 as needed.

In the case that the foregoing series of processes are performed in software, a program constituting the software is installed from a network, e.g., the Internet, etc., or a storage medium, e.g., the removable medium 1411, etc.

Those skilled in the art shall appreciate that such a storage medium will not be limited to the removable medium 1411 illustrated in FIG. 14 in which the program is stored and which is distributed separately from the apparatus to provide a user with the program. Examples of the removable medium 1411 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively the storage medium can be the ROM 1402, a hard disk included in the storage portion 1408, etc., in which the program is stored and which is distributed together with the apparatus including the same to the user.

Application examples according to the present disclosure are described with reference to FIG. 15 to FIG. 17 below.

Application Example Regarding eNB

First Application Example

Figure 15:
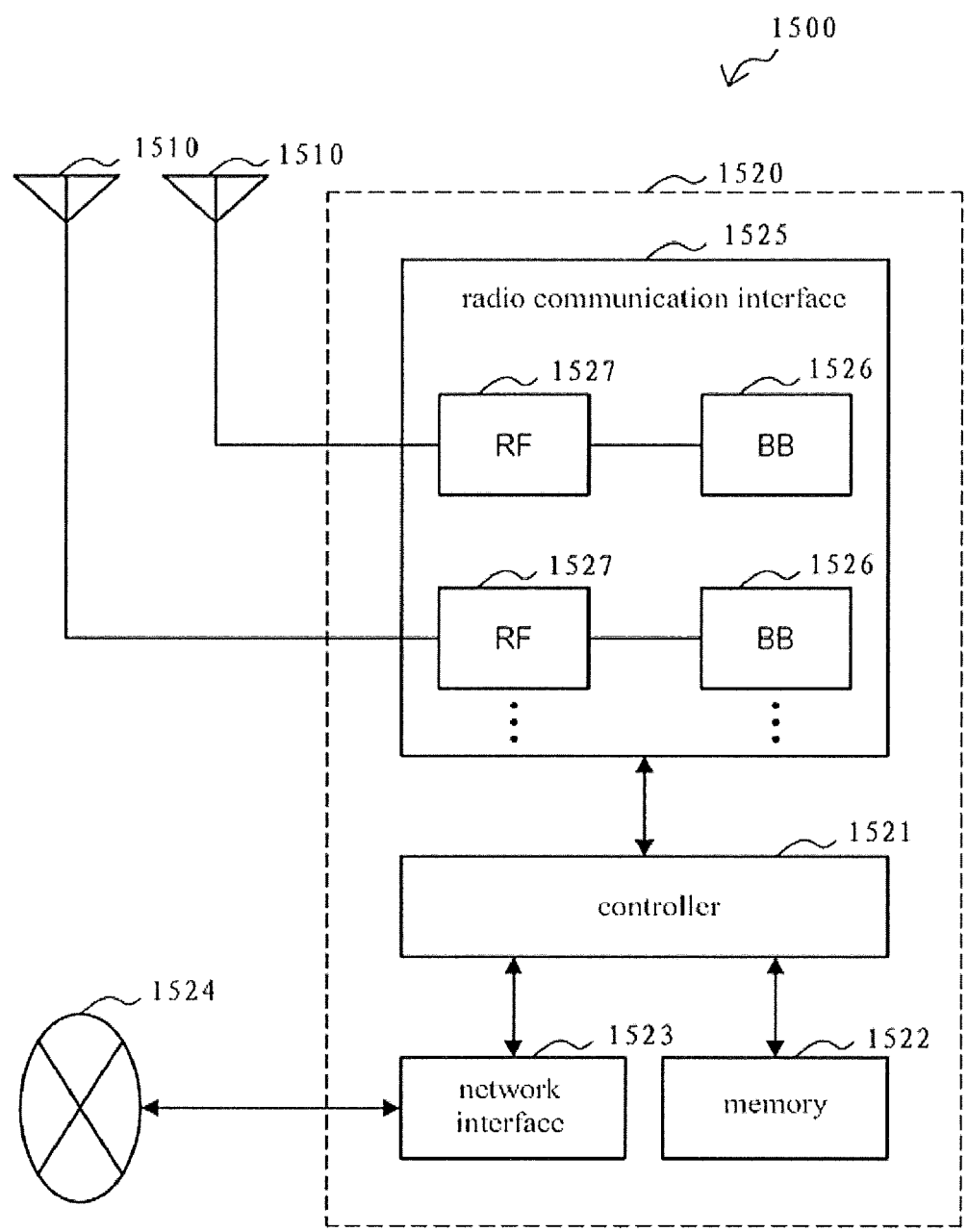
FIG. 15 is a block diagram illustrating a first example of a schematic configuration of an evolved Node B (eNB) to which the technology of the present disclosure may be applied.

FIG. 15 is a block diagram illustrating a first example of a schematic configuration of an eNB to which the technology of the present disclosure may be applied. An eNB 1500 includes one or more antennas 1510 and a base station apparatus 1520. Each antenna 1510 and the base station apparatus 1520 may be connected to each other via an RF cable.

Each of the antennas 1510 includes a single or multiple antenna elements (such as multiple antenna elements included in an MIMO antenna), and is used for the base station apparatus 1520 to transmit and receive radio signals. The eNB 1500 may include the multiple antennas 1510, as illustrated in FIG. 15. For example, the multiple antennas 1510 may be compatible with multiple frequency bands used by the eNB 1500. Although FIG. 15 illustrates the example in which the eNB 1500 includes the multiple antennas 1510, the eNB 1500 may also include a single antenna 1510.

The base station apparatus 1520 includes a controller 1521, a memory 1522, a network interface 1523, and a radio communication interface 1525.

The controller 1521 may be, for example, a CPU or a DSP, and operates various functions of a higher layer of the base station apparatus 1520. For example, the controller 1521 generates a data packet from data in signals processed by the radio communication interface 1525, and transfers the generated packet via the network interface 1523. The controller 1521 may bundle data from multiple base band processors to generate the bundled packet, and transfer the generated bundled packet. The controller 1521 may have logical functions of performing control such as radio resource control, radio bearer control, mobility management, admission control, and scheduling. The control may be performed in cooperation with an eNB or a core network node in the vicinity. The memory 1522 includes RAM and ROM, and stores a program that is executed by the controller 1521, and various types of control data (such as a terminal list, transmission power data, and scheduling data).

The network interface 1523 is a communication interface for connecting the base station apparatus 1520 to a core network 1524. The controller 1521 may communicate with a core network node or another eNB via the network interface 1523. In that case, the eNB 1500, and the core network node or the other eNB may be connected to each other through a logical interface (such as an S1 interface and an X2 interface). The network interface 1523 may also be a wired communication interface or a radio communication interface for radio backhaul. If the network interface 1523 is a radio communication interface, the network interface 1523 may use a higher frequency band for radio communication than a frequency band used by the radio communication interface 1525.

The radio communication interface 1525 supports any cellular communication scheme such as Long Term Evolution (LTE) and LTE-Advanced, and provides radio connection to a terminal positioned in a cell of the eNB 1500 via the antenna 1510. The radio communication interface 1525 may typically include, for example, a baseband (BB) processor 1526 and an RF circuit 1527. The BB processor 1526 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 1526 may have a part or all of the above-described logical functions instead of the controller 1521. The BB processor 1526 may be a memory that stores a communication control program, or a module that includes a processor and a related circuit configured to execute the program. Updating the program may allow the functions of the BB processor 1526 to be changed. The module may be a card or a blade that is inserted into a slot of the base station apparatus 1520. Alternatively, the module may also be a chip that is mounted on the card or the blade. Meanwhile, the RF circuit 1527 may include, for example, a mixer, a filter, and an amplifier, and transmits and receives radio signals via the antenna 1510.

The radio communication interface 1525 may include the multiple BB processors 1526, as illustrated in FIG. 15. For example, the multiple BB processors 1526 may be compatible with multiple frequency bands used by the eNB 1500. The radio communication interface 1525 may include the multiple RF circuits 1527, as illustrated in FIG. 15. For example, the multiple RF circuits 1527 may be compatible with multiple antenna elements. Although FIG. 15 illustrates the example in which the radio communication interface 1525 includes the multiple BB processors 1526 and the multiple RF circuits 1527, the radio communication interface 1525 may also include a single BB processor 1526 or a single RF circuit 1527.

Second Application Example

Figure 16:
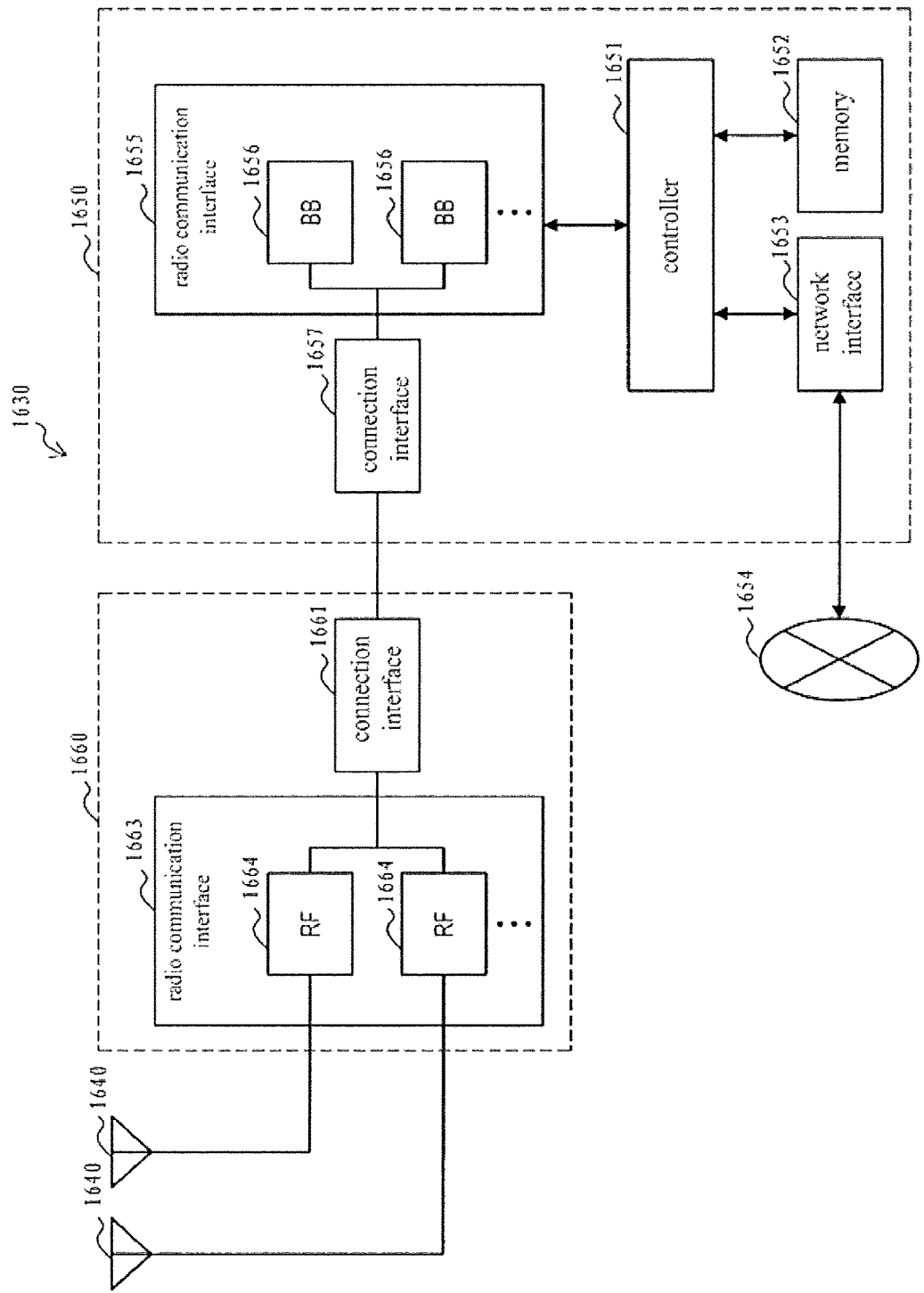
FIG. 16 is a block diagram illustrating a second example of a schematic configuration of an eNB to which the technology of the present disclosure may be applied.

FIG. 16 is a block diagram illustrating a second example of a schematic configuration of an eNB to which the technology of the present disclosure may be applied. An eNB 1630 includes one or more antennas 1640, a base station apparatus 1650, and an RRH 1660. Each antenna 1640 and the RRH 1660 may be connected to each other via an RF cable. The base station apparatus 1650 and the RRH 1660 may be connected to each other via a high speed line such as an optical fiber cable.

Each of the antennas 1640 includes a single or multiple antenna elements (such as multiple antenna elements included in an MIMO antenna), and is used for the RRH 1660 to transmit and receive radio signals. The eNB 1630 may include the multiple antennas 1640, as illustrated in FIG. 16. For example, the multiple antennas 1640 may be compatible with multiple frequency bands used by the eNB 1630. Although FIG. 16 illustrates the example in which the eNB 1630 includes the multiple antennas 1640, the eNB 1630 may also include a single antenna 1640.

The base station apparatus 1650 includes a controller 1651, a memory 1652, a network interface 1653, a radio communication interface 1655, and a connection interface 1657. The controller 1651, the memory 1652, and the network interface 1653 are the same as the controller 1521, the memory 1522, and the network interface 1523 described with reference to FIG. 15.

The radio communication interface 1655 supports any cellular communication scheme such as LTE and LTE-Advanced, and provides radio communication to a terminal positioned in a sector corresponding to the RRH 1660 via the RRH 1660 and the antenna 1640. The radio communication interface 1655 may typically include, for example, a BB processor 1656. The BB processor 1656 is the same as the BB processor 1526 described with reference to FIG. 15, except the BB processor 1656 is connected to the RF circuit 1664 of the RRH 1660 via the connection interface 1657. The radio communication interface 1655 may include the multiple BB processors 1656, as illustrated in FIG. 16. For example, the multiple BB processors 1656 may be compatible with multiple frequency bands used by the eNB 1630. Although FIG. 16 illustrates the example in which the radio communication interface 1655 includes the multiple BB processors 1656, the radio communication interface 1655 may also include a single BB processor 1656.

The connection interface 1657 is an interface for connecting the base station apparatus 1650 (radio communication interface 1655) to the RRH 1660. The connection interface 1657 may also be a communication module for communication in the above-described high speed line that connects the base station apparatus 1650 (radio communication interface 1655) to the RRH 1660.

The RRH 1660 includes a connection interface 1661 and a radio communication interface 1663.

The connection interface 1661 is an interface for connecting the RRH 1660 (radio communication interface 1663) to the base station apparatus 1650. The connection interface 1661 may also be a communication module for communication in the above-described high speed line.

The radio communication interface 1663 transmits and receives radio signals via the antenna 1640. The radio communication interface 1663 may typically include, for example, the RF circuit 1664. The RF circuit 1664 may include, for example, a mixer, a filter, and an amplifier, and transmits and receives radio signals via the antenna 1640. The radio communication interface 1663 may include multiple RF circuits 1664, as illustrated in FIG. 16. For example, the multiple RF circuits 1664 may support multiple antenna elements. Although FIG. 16 illustrates the example in which the radio communication interface 1663 includes the multiple RF circuits 1664, the radio communication interface 1663 may also include a single RF circuit 1664.

In the eNB 1500 and eNB 1630 shown in FIG. 15 and FIG. 16, the acquiring unit described with reference to FIGS. 2, 4 and 5 and the receiving unit 504 and the notifying unit 508 described with reference to FIG. 5 may be implemented by the radio communication interface 1525 and the radio communication interface 1655 and/or the radio communication interface 1663. At least a part of the functions of the spectrum coordinator may also be implemented by the controller 1521 and the controller 1651.

Application Example Regarding User Equipment

Figure 17:
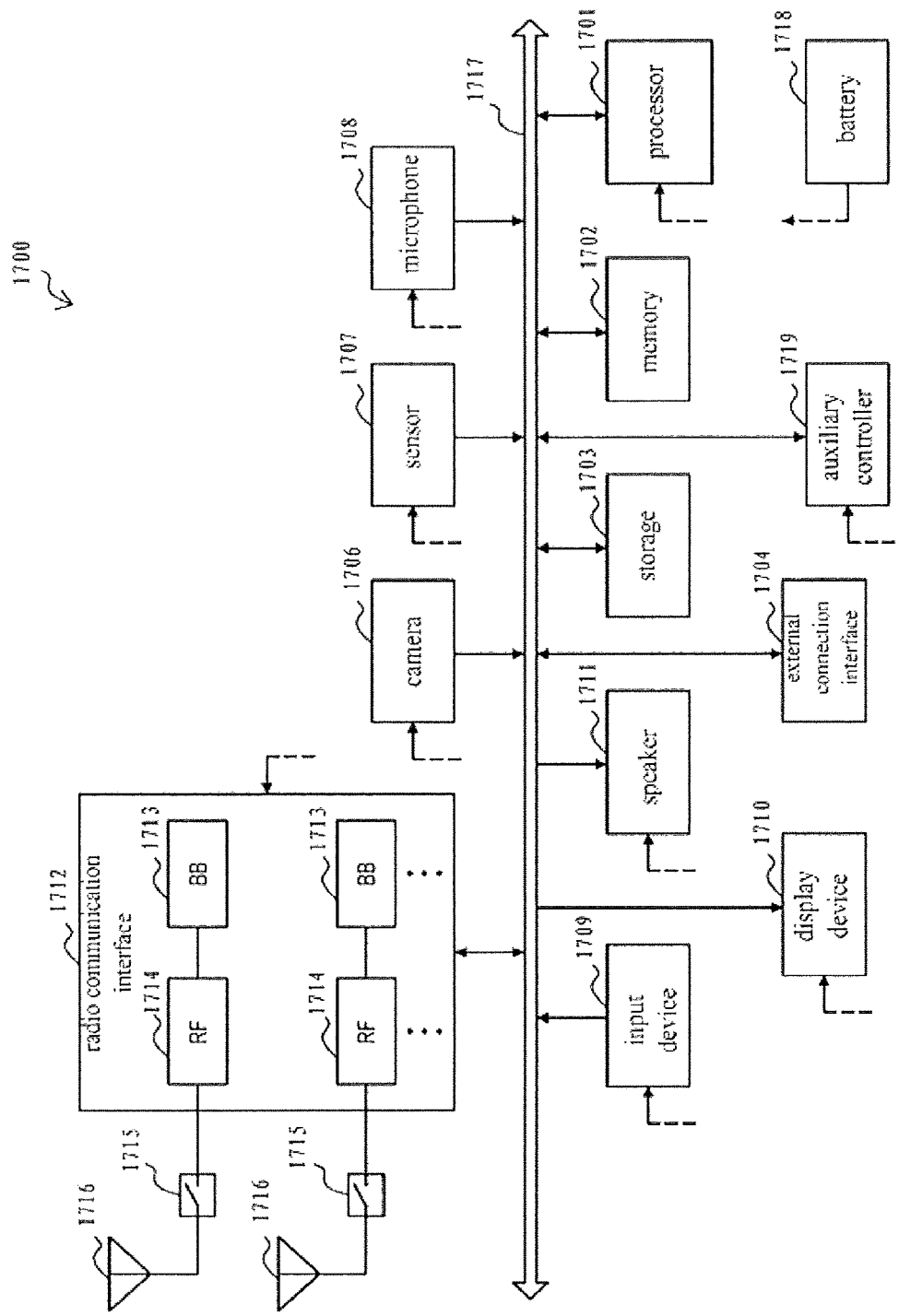
FIG. 17 is a block diagram illustrating an example of a schematic configuration of a smartphone to which the technology of the present disclosure may be applied.

FIG. 17 is a block diagram illustrating an example of a schematic configuration of a smartphone 1700 to which the technology of the present disclosure may be applied. The smartphone 1700 includes a processor 1701, a memory 1702, a storage 1703, an external connection interface 1704, a camera 1706, a sensor 1707, a microphone 1708, an input device 1709, a display device 1710, a speaker 1711, a radio communication interface 1712, one or more antenna switches 1715, one or more antennas 1716, a bus 1717, a battery 1718, and an auxiliary controller 1719.

The processor 1701 may be, for example, a CPU or a system on a chip (SoC), and controls functions of an application layer and another layer of the smartphone 1700. The memory 1702 includes RAM and ROM, and stores a program that is executed by the processor 1701, and data. The storage 1703 may include a storage medium such as a semiconductor memory and a hard disk. The external connection interface 1704 is an interface for connecting an external device such as a memory card and a universal serial bus (USB) device to the smartphone 1700.

The camera 1706 includes an image sensor such as a charge coupled device (CCD) and a complementary metal oxide semiconductor (CMOS), and generates a captured image. The sensor 1707 may include a group of sensors such as a measurement sensor, a gyro sensor, a geomagnetic sensor, and an acceleration sensor. The microphone 1708 converts sounds that are input to the smartphone 1700 to audio signals. The input device 1709 includes, for example, a touch sensor configured to detect touch onto a screen of the display device 1710, a keypad, a keyboard, a button, or a switch, and receives an operation or an information input from a user. The display device 1710 includes a screen such as a liquid crystal display (LCD) and an organic light-emitting diode (OLED) display, and displays an output image of the smartphone 1700. The speaker 1711 converts audio signals that are output from the smartphone 1700 to sounds.

The radio communication interface 1712 supports any cellular communication scheme such as LTE and LTE-Advanced, and performs radio communication. The radio communication interface 1712 may typically include, for example, a BB processor 1713 and an RF circuit 1714. The BB processor 1713 may perform, for example, encoding/decoding, modulating/demodulating, and multiplexing/demultiplexing, and performs various types of signal processing for radio communication. Meanwhile, the RF circuit 1714 may include, for example, a mixer, a filter, and an amplifier, and transmits and receives radio signals via the antenna 1716. The radio communication interface 1712 may be a one chip module having the BB processor 1713 and the RF circuit 1714 integrated thereon. The radio communication interface 1712 may include the multiple BB processors 1713 and the multiple RF circuits 1714, as illustrated in FIG. 17. Although FIG. 17 illustrates the example in which the radio communication interface 1712 includes the multiple BB processors 1713 and the multiple RF circuits 1714, the radio communication interface 1712 may also include a single BB processor 1713 or a single RF circuit 1714.

Furthermore, in addition to a cellular communication scheme, the radio communication interface 1712 may support another type of radio communication scheme such as a short-distance wireless communication scheme, a near field communication scheme, and a wireless local area network (LAN) scheme. In that case, the radio communication interface 1712 may include the BB processor 1713 and the RF circuit 1714 for each radio communication scheme.

Each of the antenna switches 1715 switches connection destinations of the antennas 1716 among multiple circuits (such as circuits for different radio communication schemes) included in the radio communication interface 1712.

Each of the antennas 1716 includes a single or multiple antenna elements (such as multiple antenna elements included in an MIMO antenna), and is used for the radio communication interface 1712 to transmit and receive radio signals. The smartphone 1700 may include the multiple antennas 1716, as illustrated in FIG. 17. Although FIG. 17 illustrates the example in which the smartphone 1700 includes the multiple antennas 1716, the smartphone 1700 may also include a single antenna 1716.

Furthermore, the smartphone 1700 may include the antenna 1716 for each radio communication scheme. In that case, the antenna switches 1715 may be omitted from the configuration of the smartphone 1700.

The bus 1717 connects the processor 1701, the memory 1702, the storage 1703, the external connection interface 1704, the camera 1706, the sensor 1707, the microphone 1708, the input device 1709, the display device 1710, the speaker 1711, the radio communication interface 1712, and the auxiliary controller 1719 to each other. The battery 1718 supplies power to blocks of the smartphone 1700 illustrated in FIG. 17 via feeder lines, which are partially shown as dashed lines in the figure. The auxiliary controller 1719 operates a minimum necessary function of the smartphone 1700, for example, in a sleep mode.

In the smartphone 1700 illustrated in FIG. 17, the requesting unit, the receiving unit and the notifying unit described with reference to FIGS. 6 to 8 may be implemented by the radio communication interface 1712. At least a part of the functions of the devices 600, 700 and 800 may also be implemented by the processor 1701 or the auxiliary controller 1719.

Preferred embodiments of the present disclosure are described with reference to the drawings above, but the present disclosure is of course not limited to the above examples. Those skilled in the art may make various changes and modifications within the scope of the appended claims, and it should be understood that these changes and modifications naturally fall within the technical scope of the present disclosure.

For example, in the above embodiments, multiple functions included in one unit may be implemented by separated devices. Alternatively, in the above embodiments, multiple functions implemented by multiple units may be implemented by separated devices. In addition, one of the above functions may be implemented by multiple units. As a matter of course, such configuration is included in the technical scope of the present disclosure.

In the description, steps described in the flowcharts not only include processing performed in a time sequence according to the order described, but also include processing performed concurrently or separately but not necessarily chronically. In addition, even if in steps performed in the time sequence, as a matter of course, the order may be changed appropriately.

The invention claimed is:

1. An electronic apparatus for coordinating use of shared radio transmission resources by a plurality of systems, the electronic apparatus comprising one or more processors configured to:
   acquire use status of the shared radio transmission resources; and
   allocate, according to the use status, the shared radio transmission resources to communication equipment based on influence of to-be-allocated resource elements of one system of the plurality of systems on available resource elements of an other system in the plurality of systems, such that a sum of a first number of the available resource elements and a second number of occupied resource elements of the other system is not smaller than a third number of preserved resource elements of the other system,
   wherein a resource allocation granularity of the one system is finer than a resource allocation granularity of the other system.

2. The electronic apparatus according to claim 1, wherein the one or more processors are further configured to allocate, based on a resource request from communication equipment in the one system of the plurality of systems, the shared radio transmission resources to the communication equipment in the one system.

3. The electronic apparatus according to claim 2, wherein the resource request comprises at least one of a traffic requirement, geographical location information, or a resource use priority.

4. The electronic apparatus according to claim 2, wherein the electronic apparatus is implemented in a base station in the one system, and the electronic apparatus further comprises:
   circuitry configured to receive the resource request from the communication equipment in the one system, and notify the allocated resources to the communication equipment in the one system.

5. The electronic apparatus according to claim 1, wherein the one or more processors are further configured to:
   divide the shared radio transmission resources based on influence of the one system on resource availability of the other system; and
   allocate resources to the communication equipment according to the dividing of the shared radio transmission resources.

6. The electronic apparatus according to claim 2, wherein the one or more processors are further configured to allocate resources to the communication equipment in the one system from the to-be-allocated resource elements according to use conditions of occupied resource elements of the one system, the occupied resource elements of the one system corresponding to same resource element of the other system as the to-be-allocated resource elements, and/or to allocate resources to the communication equipment in the one system according to a resource use habit of the other system to reduce resource use collision with the other system.

7. The electronic apparatus according to claim 3, wherein the one or more processors are further configured to determine a use period of the resources allocated to the communication equipment in the one system according to a use period of the occupied resource elements of the one system.

8. The electronic apparatus according to claim 1, wherein the one or more processors are further configured to acquire the use status in at least one of the following manners: information interacting, spectrum sensing, or broadcast querying.

9. The electronic apparatus according to claim 1, wherein the use status comprises occupied resources of the shared radio transmission resources.

10. The electronic apparatus according to claim 9, wherein the use status further comprises a type of communication equipment occupying the occupied resources, and in a case that the type of the communication equipment occupying the occupied resources is communication equipment in the one system, the use status further comprises a number of the communication equipment in the one system occupying the occupied resources.

11. The electronic apparatus according to claim 4, wherein the circuitry is further configured to receive information on resources selected to be used from the allocated resources by the communication equipment in the one system.

12. The electronic apparatus according to claim 1, wherein the one system is an LTE system, and the other system is one or more of a WI-FI system, a broadcast television system, a radar system, or an infrared system.

13. An electronic apparatus in a wireless communication system, the electronic apparatus comprising one or more processors configured to:
   send a resource request to a spectrum coordinator;
   receive resources allocated by the spectrum coordinator in response to the resource request; and select resources to be used from the allocated resources according to a service quality requirement;

wherein the spectrum coordinator is used for coordinating use of shared radio transmission resources by a plurality of systems comprising the wireless communication system, and the allocated resources are allocated by the spectrum coordinator based on influence of to-be-allocated resource elements of the wireless communication system on available resource elements in an other system of the plurality of systems, such that a sum of a first number of the available resource elements and a second number of occupied resource elements of the other system is not smaller than a third number of preserved resource elements of the other system, and wherein a resource allocation granularity of the wireless communication system is finer than a resource allocation granularity of the other system.

14. The electronic apparatus according to claim 13, wherein the one or more processors further receive from the spectrum coordinator a use period of the allocated resources.

15. The electronic apparatus according to claim 13, wherein the resource request comprises at least one of a traffic requirement, geographical location information, or a resource use priority.

16. The electronic apparatus according to claim 13, wherein the one or more processors are further configured to notify information on the resources selected to be used to the spectrum coordinator.

17. The electronic apparatus according to claim 13, wherein:

the resource request is a spectrum sensing request; and the one or more processors are further configured to sense the allocated resources, and select the resources to be used from the allocated resources according to a sensing result.

18. The electronic apparatus according to claim 13, wherein the wireless communication system is an LTE system, and the other system is one or more of a WI-FI system, a broadcast television system, a radar system, or an infrared system.

19. The electronic apparatus according to claim 18, wherein the resource allocation granularity of the LTE system is based on a time-frequency resource block, and the resource allocation granularity of the WI-FI system is based on a sub channel having a predetermined bandwidth.

20. A method in a wireless communication system, comprising:

sending a resource request to a spectrum coordinator;

receiving resources allocated by the spectrum coordinator in response to the resource request; and selecting resources to be used from the allocated resources according to a service quality requirement;

wherein the spectrum coordinator is used for coordinating use of shared radio transmission resources by a plurality of systems comprising the wireless communication system, and the allocated resources are allocated by the spectrum coordinator based on influence of to-be-allocated resource elements of the wireless communication system on available resource elements of an other system in the plurality of systems, such that a sum of a first number of the available resource elements and a second number of occupied resource elements of the other system is not smaller than a third number of preserved resource elements of the other system; and wherein a resource allocation granularity of the wireless communication system is finer than a resource allocation granularity of the other system.

* * * * *